US011978477B2

(12) United States Patent
Yamauchi et al.

(10) Patent No.: US 11,978,477 B2
(45) Date of Patent: May 7, 2024

(54) INFORMATION PROVIDING METHOD

(71) Applicant: Panasonic Intellectual Property Corporation of America, Torrance, CA (US)

(72) Inventors: Masaki Yamauchi, San Jose, CA (US); Nanami Fujiwara, Santa Clara, CA (US)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 0 days.

(21) Appl. No.: 18/221,483

(22) Filed: Jul. 13, 2023

(65) Prior Publication Data

US 2024/0005948 A1 Jan. 4, 2024

Related U.S. Application Data

(63) Continuation of application No. 17/218,698, filed on Mar. 31, 2021, now Pat. No. 11,741,987, which is a continuation of application No. PCT/JP2019/038857, filed on Oct. 2, 2019.

(60) Provisional application No. 62/740,052, filed on Oct. 2, 2018.

(51) Int. Cl.
*G10L 25/78* (2013.01)
*G10L 15/20* (2006.01)
*G10L 15/22* (2006.01)

(52) U.S. Cl.
CPC ............ *G10L 25/78* (2013.01); *G10L 15/20* (2013.01); *G10L 15/22* (2013.01); *G10L 2015/228* (2013.01); *G10L 2025/783* (2013.01)

(58) Field of Classification Search
CPC .......... G10L 25/78; G10L 15/20; G10L 15/22
See application file for complete search history.

(56) References Cited

U.S. PATENT DOCUMENTS

2002/0188455 A1\* 12/2002 Shioda ................ G10L 17/26
704/E15.045
2018/0254096 A1\* 9/2018 Karunanithi ....... G06Q 10/0639

FOREIGN PATENT DOCUMENTS

JP 2018-32272 3/2018

OTHER PUBLICATIONS

International Search Report dated Dec. 17, 2019 in International (PCT) Application No. PCT/JP2019/038857.

\* cited by examiner

*Primary Examiner* — Ibrahim Siddo
(74) *Attorney, Agent, or Firm* — Wenderoth, Lind & Ponack, L.L.P.

(57) ABSTRACT

An information providing method includes: generating first information indicating that a friendly gathering is occurring in a home when (i) a threshold amount of time or longer has elapsed from a start time of food preparation by a user and (ii) the volume of sound in a dining space is a first threshold volume or greater; obtaining, from a second information processing apparatus connected to a first information processing apparatus, information indicating first request content over a network; and when content of the first information is included in the first request content, outputting, to the second information processing apparatus, second information including information for identifying the user or the home, using the first information generated.

7 Claims, 23 Drawing Sheets

FIG. 8

| Refrigerator opening times |
|---|
| 7:05, 7:07, 18:10, 18:12, 18:20, 18:21, 20:00, 20:20, 22:50 |

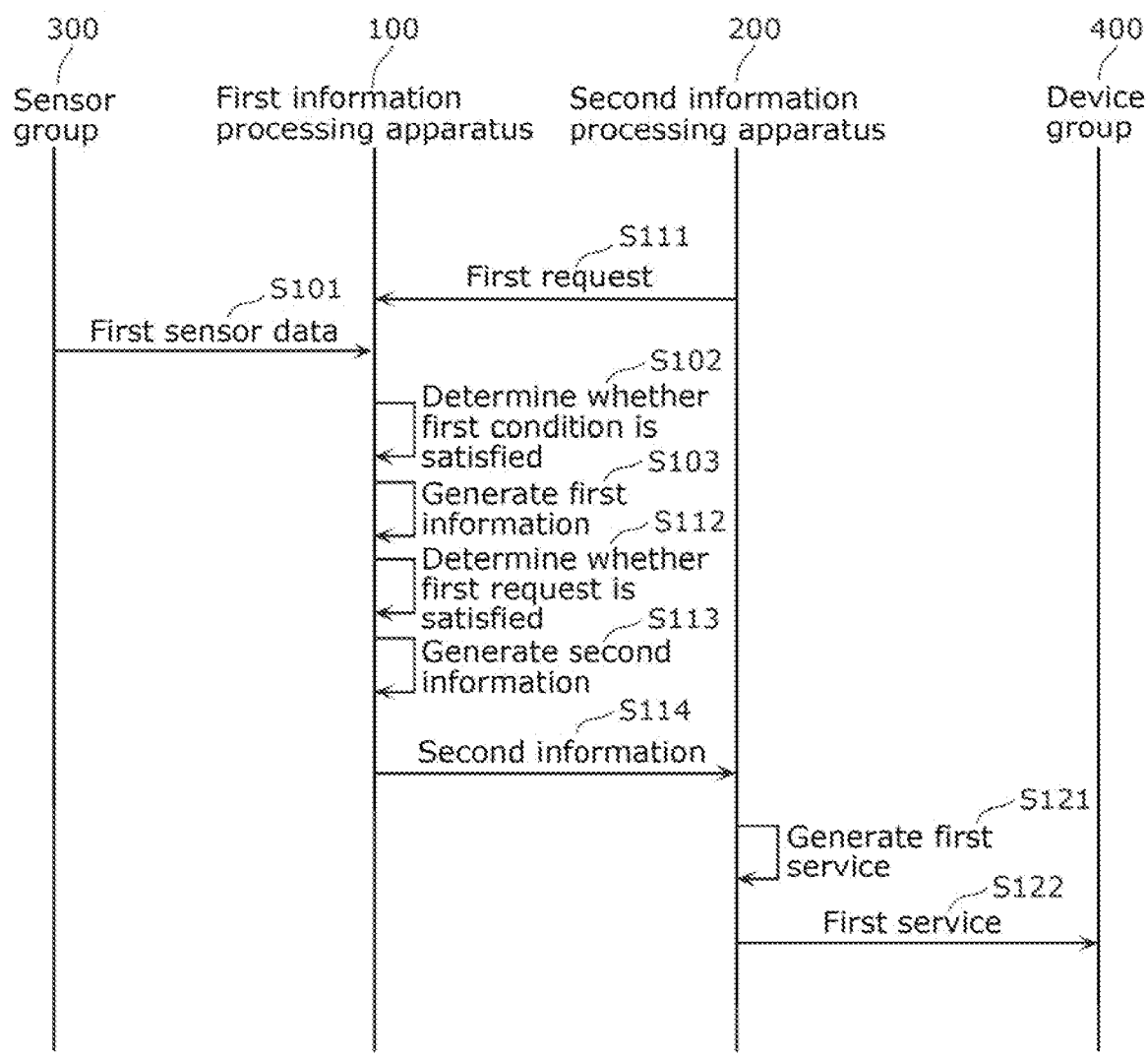

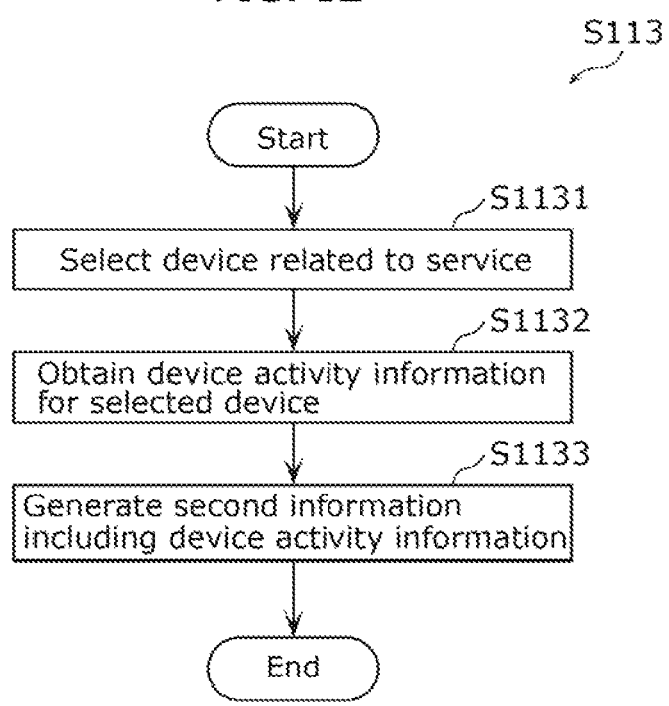

FIG. 13A

|  | Service 1 | Service 2 | ... |
|---|---|---|---|
| Sight | ✓ | — |  |
| Hearing | ✓ | — |  |
| Smell | — | ✓ |  |
| Touch (back, waist) | — | — |  |
| Touch (eyes) | — | — |  |

FIG. 13B

|  | Television | Speaker | Aroma diffuser | Massage chair | Eye massager | ... |
|---|---|---|---|---|---|---|
| Sight | ✓ | — | — | — | — |  |
| Hearing | ✓ | ✓ | — | — | — |  |
| Smell | — | — | ✓ | — | — |  |
| Touch (back, waist) | — | — | — | ✓ | — |  |
| Touch (eyes) | — | — | — | — | ✓ |  |

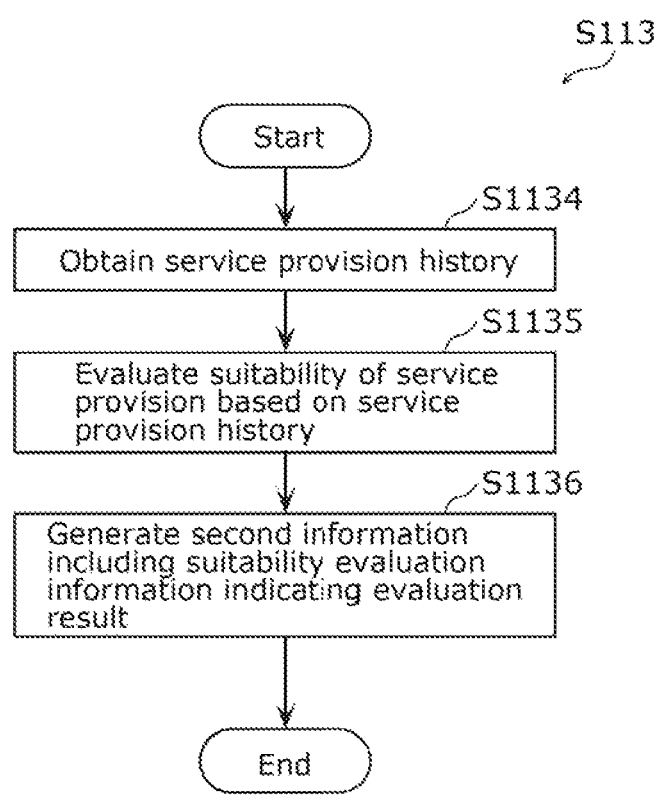

FIG. 16A

|  | Number of times service can be provided per day | Situations in which service cannot be provided | ... |
|---|---|---|---|
| Service 1 | No restriction | User situation A |  |
| Service 2 | Once a day | User situation B |  |
| Service 3 | No restriction | — |  |
| ... |  |  |  |

FIG. 16B

|  | Service 1 | Service 2 | Service 3 | ... |
|---|---|---|---|---|
| Service 1 |  | — | — |  |
| Service 2 | — |  | ✓ |  |
| Service 3 | — | ✓ |  |  |
| ... |  |  |  |  |

FIG. 16C

|  | Service 1 | Service 2 | Service 3 | ... |
|---|---|---|---|---|
| Service 1 |  | ✓ | — |  |
| Service 2 | — |  | ✓ |  |
| Service 3 | — | — |  |  |
| ... |  |  |  |  |

INFORMATION PROVIDING METHOD

FIELD

The present disclosure relates to an information providing method.

BACKGROUND

In recent years it has become possible to collect a large amount of sensor data from sensors placed in various places, and thus there is a demand to effectively use the collected sensor data. For example, if sensor data from various sensors placed in an indoor space such as a house is used, it is possible to provide services suitable to the user's situation (for example, see Japanese Patent Application Publication No. 2018-32272).

SUMMARY

Technical Problem

However, with the conventional art, there is little information that is related to how to use the sensor data, and it is therefore difficult to effectively use the sensor data for providing services.

The present disclosure provides, for example, an information providing method that can effectively use sensor data for providing services.

Solutions to Problem

An information providing method according to one aspect of the present disclosure is a method that uses a first information processing apparatus which includes a processor and memory. A first sensor is disposed in a kitchen space of a home. A second sensor is disposed in a dining space of the home. The processor: detects, via the first sensor, a start time of food preparation by a user in the kitchen space; obtains, via the second sensor, information indicating a volume of sound in the dining space; when (i) a threshold amount of time or longer has elapsed since the start time of food preparation by the user and (ii) the volume of sound in the dining space is a first threshold volume or greater, generates first information indicating that a friendly gathering is occurring in the home; obtains, from a second information processing apparatus connected to the first information processing apparatus, information indicating first request content over a network; and when content of the first information is included in the first request content, outputs, to the second information processing apparatus, second information including information for identifying the user or the home, using the first information generated.

General and specific aspect(s) disclosed above may be implemented using a system, an apparatus, an integrated circuit, a computer program, or a computer-readable recording medium such as a CD-ROM, or any combination thereof.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

The information providing method according to one aspect of the present disclosure can effectively use sensor data for providing services.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 8 illustrates one example of the sensing information related to the opening and closing of a door of a refrigerator according to Embodiment 1.

FIG. 11 is a sequence diagram for the service providing system according to Variation 2.

FIG. 12 is a flow chart illustrating one example of the process for generating the second information according to Variation 3.

FIG. 13A illustrates one example of relationships between services and the five senses according to Variation 3.

FIG. 13B illustrates one example of relationships between devices and the five senses according to Variation 3.

FIG. 14 is a flow chart illustrating one example of the process for generating the second information according to Variation 4.

FIG. 16A illustrates one example of service provision availability information according to Variation 4.

FIG. 16B illustrates one example of information indicating services that are prohibited from being provided simultaneously according to Variation 4.

FIG. 16C illustrates one example of information indicating services that are prohibited from being changed according to Variation 4.

DESCRIPTION OF EMBODIMENTS

Hereinafter, embodiments are specifically described with reference to the drawings.

Each of the following embodiments describes a general or specific example. The numerical values, shapes, materials, elements, the arrangement and connection of the elements, steps, order of the steps, etc., shown in the following embodiments are mere examples, and therefore do not limit the scope of the claims.

The figures are not necessarily precise illustrations. In the figures, elements that are essentially the same share like reference signs. Accordingly, duplicate description thereof is omitted or simplified.

Embodiment 1

Overview of Service Providing System 10

Figure 1:
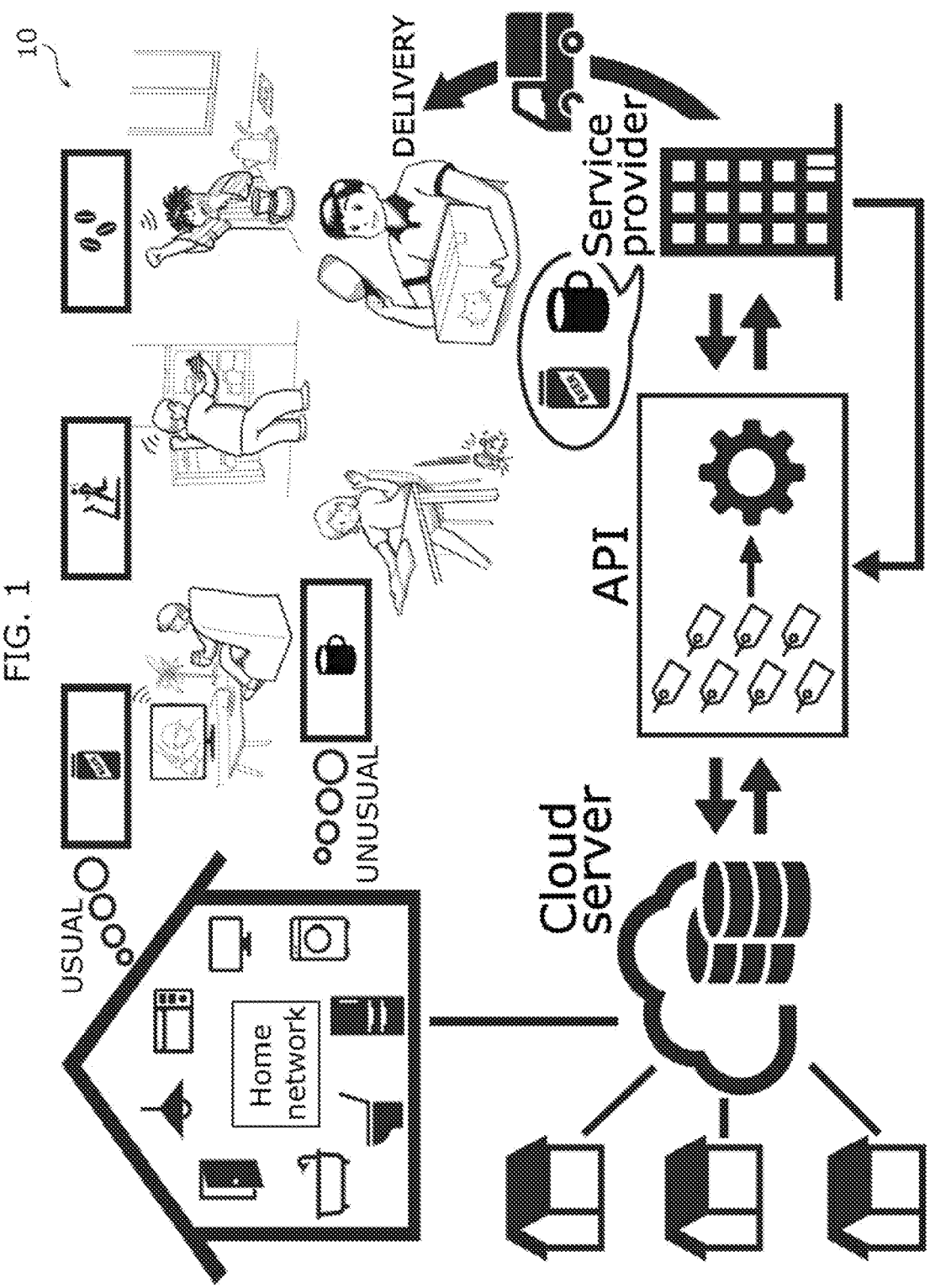
FIG. 1 illustrates an overview of the service providing system according to Embodiment 1.

First, an overview of service providing system 10 will be described with reference to FIG. 1. FIG. 1 illustrates an overview of service providing system 10 according to Embodiment 1.

In service providing system 10 according to the present embodiment, sensor data from a plurality of indoor spaces is collected by a cloud server. Examples of an indoor space include a home, an office, a building, and the inside of a vehicle. Sensor data is data based on usual activity and/or unusual activity of a user in an indoor space.

Via an application programming interface (API), each of a plurality of service providers is capable of obtaining various information based on sensor data collected by the cloud server. An API is an information processing function of a cloud server that can be called from a computer and used.

Each service provider provides a service to a user based on information obtained via the API. Examples of services include an information providing service, an advertisement delivery service, a service for automated control of devices on a home network, or any combination thereof. Note that the service is not limited to these examples. For example, the service may be a product delivery service.

Configuration of Service Providing System 10

Figure 2:
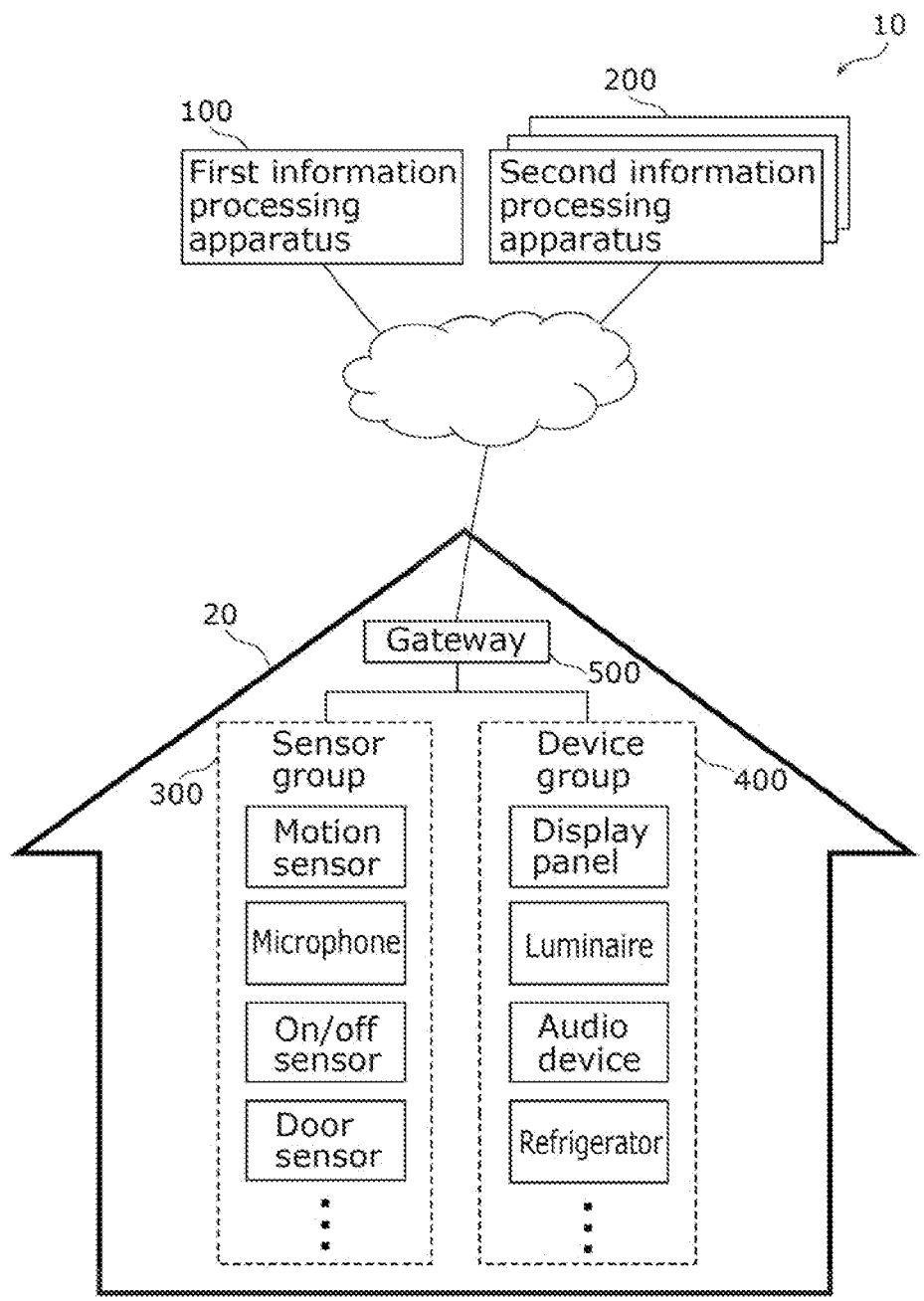
FIG. 2 illustrates the configuration of the service providing system according to Embodiment 1.

Next, the configuration of service providing system 10 will be described with reference to FIG. 2. FIG. 2 illustrates a configuration of service providing system 10 according to Embodiment 1. As illustrated in FIG. 2, service providing system 10 according to the present embodiment includes first information processing apparatus 100, second information processing apparatus 200, sensor group 300, and device group 400.

Sensor group 300 is disposed in space 20, and includes at least one sensor. Sensor group 300 is connected to a communications network such as the internet via gateway 500. Note that gateway 500 is optional; sensor group 300 may be connected to a communications network without passing through gateway 500.

Sensor group 300 outputs a sensor value indicating, for example, movement information related to a movement of a user or information related to activity/user operation of device group 400. For example, sensor group 300 can output a sensor value indicating whether a luminaire is emitting light, a sensor value indicating whether an audio device is outputting sound, a sensor value indicating whether a user is present in space 20 or a predefined region of space 20, or any combination thereof.

Sensor group 300 can include, for example, a motion sensor, a door sensor, a sound sensor, or any combination thereof. Such sensors included in sensor group 300 can be realized as, for example, an image sensor, an infrared sensor, an ultrasound sensor, a visible light sensor, a vibration sensor, a touch sensor, a microphone, or any combination thereof. Such sensors can be provided on a wall, floor, or ceiling that defines space 20, or on an electronic device or furniture disposed in space 20. Moreover, the sensors may be provided in devices included in device group 400. For example, one sensor may be a touch sensor provided in the touch screen of a smartphone or the like. Note that the sensors are not limited to the above examples.

Device group 400 is disposed in space 20, and includes at least one electronic device. Device group 400 is connected to a communications network such as the internet via gateway 500. Note that gateway 500 is optional; device group 400 may be connected to a communications network without passing through gateway 500.

Device group 400 can include, for example, a display panel, a luminaire, an audio device, a refrigerator, a vacuum cleaner, or any combination thereof. Note that the one or more devices included in device group 400 are not limited to these examples.

First information processing apparatus 100 is disposed outside of space 20 and includes a processor and memory. For example, first information processing apparatus 100 corresponds to the cloud server illustrated in FIG. 1. Note that first information processing apparatus 100 may be an edge server disposed in space 20.

Note that a cloud server refers to a server that is provided over the internet. An edge server refers to a server that is provided over a network in an area closer to the user than the internet is (such as a local area network (LAN)).

Second information processing apparatus 200 includes a processor and memory. For example, second information processing apparatus 200 is the service provider illustrated in FIG. 1. Second information processing apparatus 200 provides a service to a user via device group 400 in space 20.

This example assumes that service providing system 10 illustrated in FIG. 2 is provided in each of a plurality of indoor spaces. More specifically, first information processing apparatus 100 is provided for each of a plurality of indoor spaces, and a plurality of second information processing apparatuses 200 are connected to each first information processing apparatus 100 to provide services to each indoor space. Here, the aim is to provide of a variety of information regarding users or spaces 20 from the plurality of first information processing apparatuses 100, and to provide a variety of services using the plurality of second information processing apparatuses 200, by providing a plurality of first information processing apparatuses 100 and a plurality of second information processing apparatuses 200 individual of one another. However, new information is exchanged between the plurality of first information processing apparatuses 100 and the plurality of second information processing apparatuses 200. The present embodiment provides a system which effectively uses sensor data and provides appropriate services, by defining the exchange of such information.

Functional Configuration of First Information Processing Apparatus 100

Figure 3:
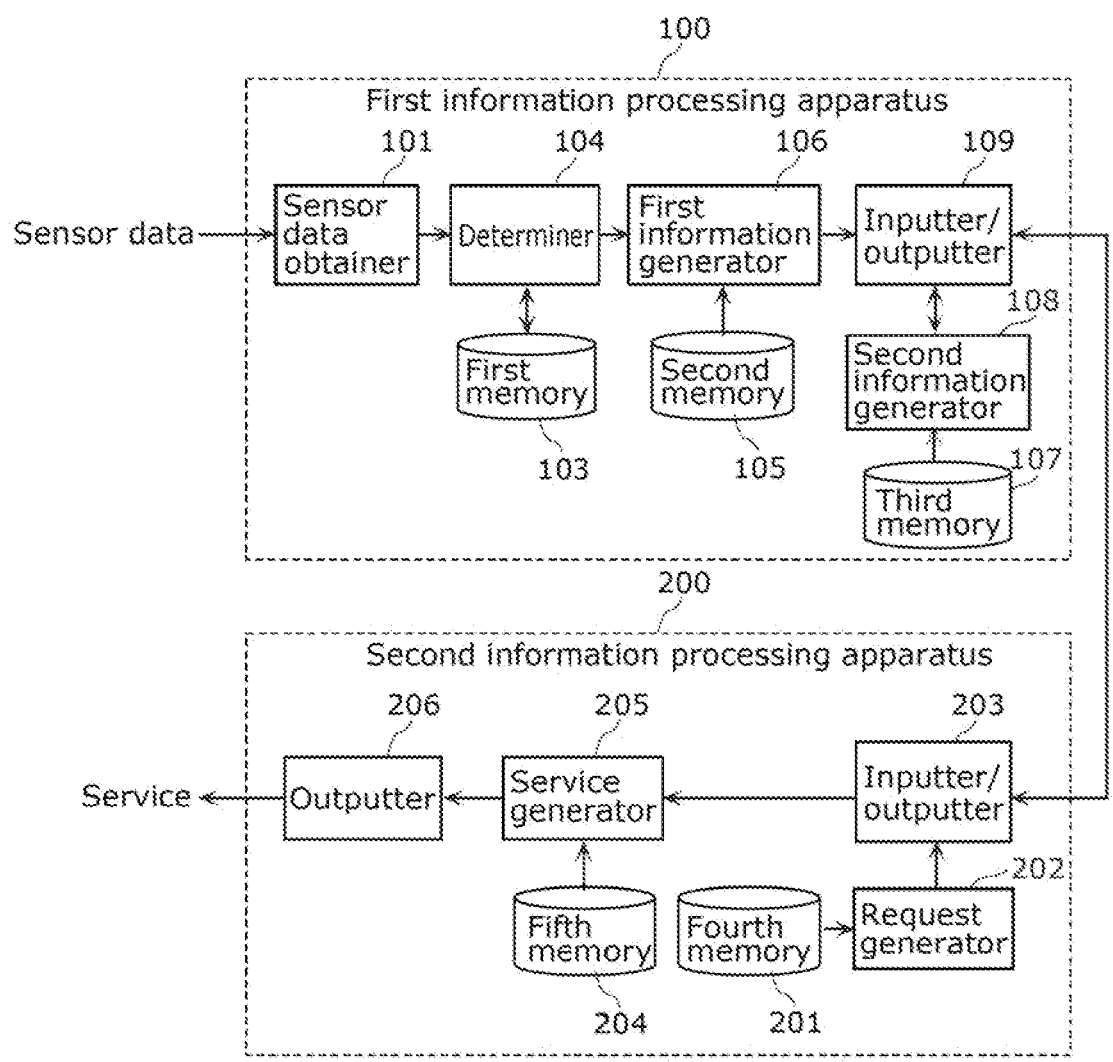
FIG. 3 illustrates the functional configurations of the first information processing apparatus and the second information processing apparatus according to Embodiment 1.

Next, the functional configuration of first information processing apparatus 100 will be described with reference to FIG. 3. FIG. 3 illustrates the functional configurations of first information processing apparatus 100 and second information processing apparatus 200 according to Embodiment 1.

As illustrated in FIG. 3, first information processing apparatus 100 according to the present embodiment includes sensor data obtainer 101, first memory 103, determiner 104, second memory 105, first information generator 106, third memory 107, second information generator 108, and inputter/outputter 109. Next, the functional blocks of first information processing apparatus 100 will be described.

Sensor data obtainer 101 obtains first sensor data including a first sensor value from sensor group 300. Part or all of first sensor data is stored in first memory 103. First sensor data may include data indicating whether a person is present in a given region in space 20, for example. First sensor data may include data indicating a state of sound output of an audio device, for example. First sensor data may include data indicating an operation state of a device. First sensor data may include data indicating whether a door of a refrigerator is open or closed.

First memory 103 stores part or all of the first sensor data obtained by sensor data obtainer 101.

Determiner 104 determines whether a first condition is satisfied or not. The first condition will be described in greater detail later.

Second memory 105 stores information for generating the first information. For example, second memory 105 stores a correspondence table in which content of the generated information is associated with mutually different conditions.

First information generator 106 generates first information when the first condition is satisfied. In the present embodiment, the first information indicates that a friendly gathering is occurring in the home, but the first information is not limited to this example.

Third memory 107 stores information for generating second information. In other words, third memory 107 stores information for identifying the user or space 20 corresponding to the first information generated by first information generator 106.

Second information generator 108 determines whether content of the first information is included in first request content included in information obtained from second information processing apparatus 200 via inputter/outputter 109. When content of the first information is included in the first request content, second information generator 108 generates the second information using the first information. The second information includes information for identifying the user or space 20 (for example, a user ID, a home address, an IP address, device identification information, etc.). For example, second information generator 108 generates the second information by reading, from third memory 107, information for identifying the user or space 20 corresponding to the first information generated by first information generator 106. Here, the second information may be information required for providing a service to the user or space 20. When content of the service to be provided is included in the first request, the second information corresponding to the content of the service may be provided. In a case in which the service is to be provided using a communications environment, one example of the second information is an IP address. In a case in which the service to be provided is for controlling a device, one example of the second information is device identification information. In a case in which the service to be provided is for controlling a device using a communications environment, one example of second information may be a combination of an IP address and device identification information.

Inputter/outputter 109 obtains information indicating the first request content (hereinafter "first request information") from second information processing apparatus 200 connected to first information processing apparatus 100 over a network. Inputter/outputter 109 further outputs the second information generated by second information generator 108 to second information processing apparatus 200.

Note that determiner 104, first information generator 106, and second information generator 108 described above are realized as, for example, a processor and memory. When an instruction or a software program that is stored in the memory is executed, the processor functions as determiner 104, first information generator 106, and second information generator 108. Determiner 104, first information generator 106, and second information generator 108 may be realized as dedicated electronic circuitry.

First memory 103, second memory 105, and third memory 107 described above are realized as, for example, semiconductor memory and/or a disk drive or the like. Inputter/outputter 109 is realized as, for example, a network interface controller (NIC) or the like.

Functional Configuration of Second Information Processing Apparatus 200

Next, the functional configuration of second information processing apparatus 200 will be described with reference to FIG. 3.

As illustrated in FIG. 3, second information processing apparatus 200 according to the present embodiment includes fourth memory 201, request generator 202, inputter/outputter 203, fifth memory 204, service generator 205, and outputter 206. Next, the functional blocks of second information processing apparatus 200 will be described.

Fourth memory 201 stores information for generating the first request information.

Request generator 202 generates the first request information. More specifically, request generator 202 references information stored in fourth memory 201 to generate the first request information indicating the first request content.

The first request content indicates requirements that a user or space to which a given service is provided should meet. In the present embodiment, the first request content indicates a requirement that a friendly gathering be occurring in the home, but the first information is not limited to this example.

Inputter/outputter 203 outputs the first request information generated by request generator 202 to first information processing apparatus 100. Inputter/outputter 203 further obtains the second information from first information processing apparatus 100.

Fifth memory 204 stores information for generating service information. For example, fifth memory 204 stores a correspondence table in which service content is associated with mutually different request content.

Service generator 205 generates first service information using the second information. The first service information is information for providing a service to the user in space 20 via device group 400.

In the present embodiment, the first service information may be, for example, information for notifying that a first member of a family is having a friendly gathering to a second member of the family who lives apart from the first member of the family. As another example, the first service information may be information for transmitting audio and/ or video of the friendly gathering including a first member of a family to a second member of the family who lives apart from the first member of the family.

Note that "service information" may also be referred to as "service content". Service content includes service information such as music or advertisement information, and device control information for providing the service.

Outputter 206 references the second information and outputs the service information generated by service generator 205 to device group 400. Note that second information processing apparatus 200 may include memory for recording the association between information corresponding to the second information and information required for providing the service, obtain information required for providing the service by referencing the second information, and provide the service to the user or space 20.

Request generator 202 and service generator 205 described above are realized as, for example, a processor and memory. When an instruction or a software program that is stored in the memory is executed, the processor functions as request generator 202 and service generator 205. Request generator 202 and service generator 205 may be realized as dedicated electronic circuitry.

Fourth memory 201 and fifth memory 204 described above are realized as, for example, semiconductor memory and/or a disk drive or the like. Inputter/outputter 203 and outputter 206 are realized as, for example, a network interface controller (NIC) or the like.

Interaction in Service Providing System 10

Figure 4:
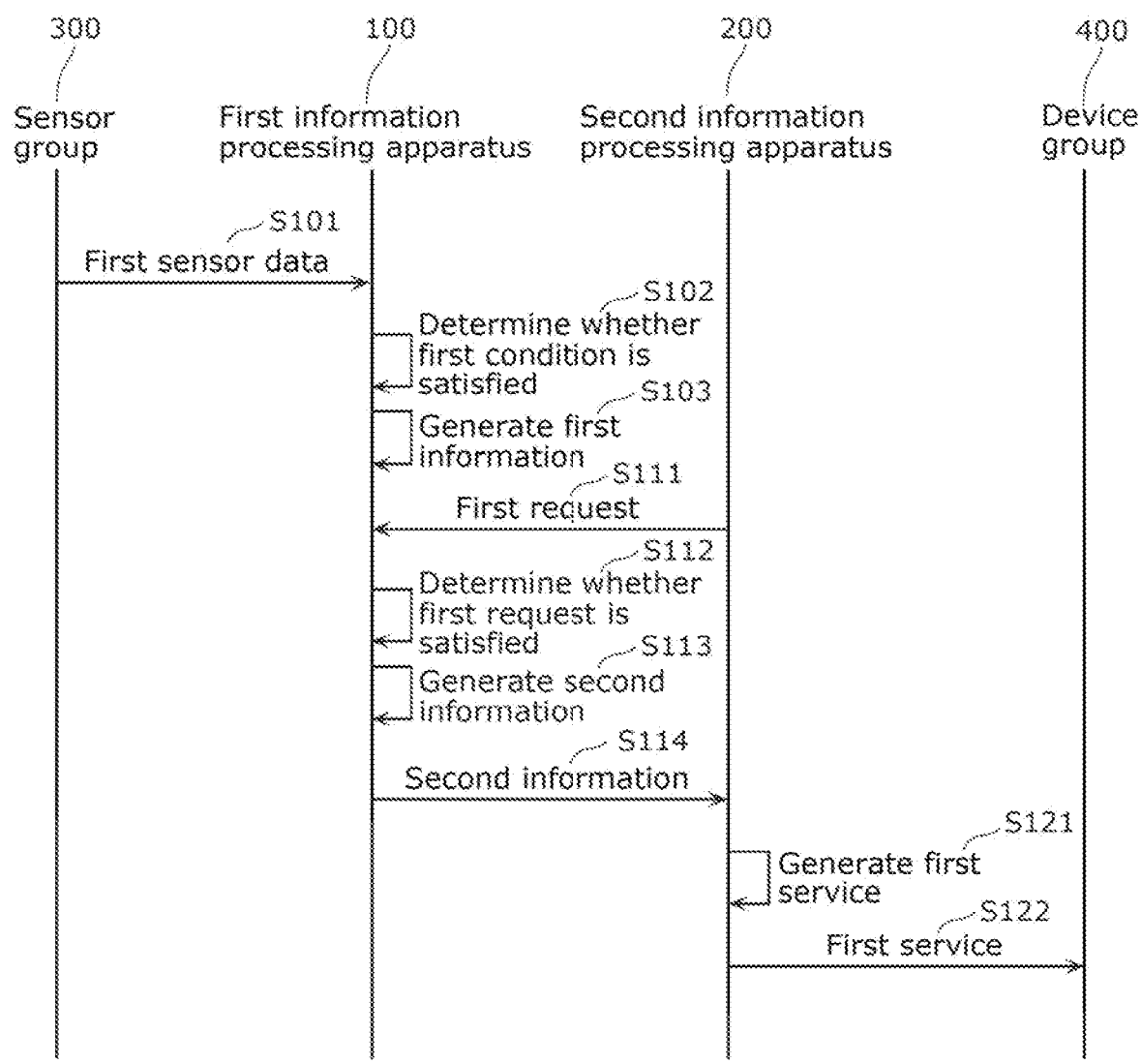
FIG. 4 is a sequence diagram for the service providing system according to Embodiment 1.

Next, interaction in service providing system 10 will be described with reference to FIG. 4. FIG. 4 is a sequence diagram for service providing system 10 according to Embodiment 1.

As illustrated in FIG. 4, first information processing apparatus 100 obtains the first sensor data including the first sensor value from sensor group 300 (S101), First information processing apparatus 100 determines whether the first condition is satisfied based on the first sensor data (S102). Stated differently, the obtainment of the first sensor data can be said to be trigger information for determining whether the first condition is satisfied. If the first condition is satisfied, first information processing apparatus 100 generates the first information (S103). The first sensor data that serves as the trigger information for determining whether the first condition is satisfied is used in the determining of whether the first condition is satisfied. In other words, in addition to being used as trigger information, the first sensor data can be used in the determining of whether the first condition is satisfied, which corresponds to a condition for providing a service. Moreover, first sensor data that served as trigger information for determining whether the first condition is satisfied in the past may be used in the determining whether the first condition is satisfied.

Here, if first information processing apparatus 100 obtains the first request information from second information processing apparatus 200 (S111), first information processing apparatus 100 determines whether there is a user or space that satisfies the first request content (S112). If first information processing apparatus 100 determines that there is a user or space that satisfies the first request content, first information processing apparatus 100 generates the second information (S113). First information processing apparatus 100 then outputs the generated second information to second information processing apparatus 200 (S114).

Second information processing apparatus 200 generates the first service information based on the second information (S121). The first service information is information for providing a first service to the user in space 20 via device group 400. Second information processing apparatus 200 then outputs the first service information to device group 400 (S122).

Note that the sequence diagram illustrated in FIG. 4 is a non-limiting example. Moreover, the order of the processes in FIG. 4 may be changed.

Processes Performed by First Information Processing Apparatus 100

Figure 5:
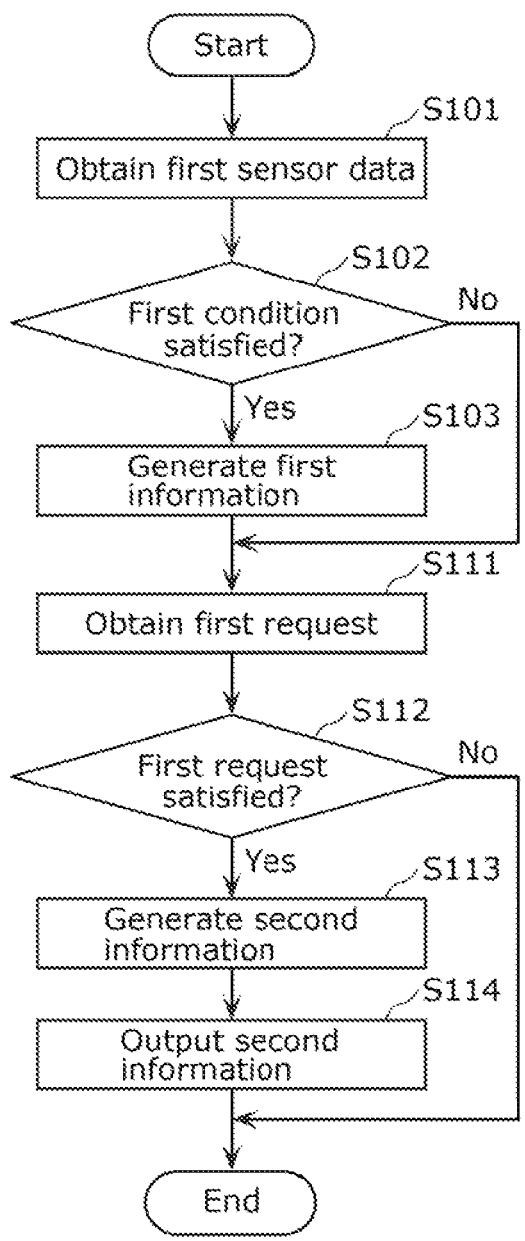
FIG. 5 is a flow chart illustrating processes performed by the first information processing apparatus according to Embodiment 1.

Next, processes performed by first information processing apparatus 100 (i.e., the information providing method) will be described in greater detail with reference to FIG. 5. FIG. 5 is a flow chart illustrating processes performed by first information processing apparatus 100 according to Embodiment 1.

As illustrated in FIG. 5, sensor data obtainer 101 obtains the first sensor data including the first sensor value from sensor group 300 disposed in space 20 (S101). Determiner 104 determines whether the first condition is satisfied based on the first sensor data (S102). This determination process will be described in greater detail later with reference to the figures.

If the first condition is satisfied (Yes in S102), first information generator 106 generates the first information (S103). If the first condition is not satisfied (No in S102), first information generator 106 skips the process for generating the first information, that is to say, first information generator 106 does not generate the first information.

Next, inputter/outputter 109 obtains the first request information indicating the first request content from second information processing apparatus 200 (S111). Second information generator 108 determines whether there is a user or space that matches the first request content (S112). In other words, second information generator 108 determines whether the first request content includes the content of the first information or not.

When second information generator 108 determines that there is a user or space that matches the first request content (Yes in S112), second information generator 108 generates the second information using the generated first information (S113), Inputter/outputter 203 then outputs the generated second information to second information processing apparatus 200 (S114). When second information generator 108 determines that there is not a user or space that matches the first request content (No in S112), second information generator 108 skips the processes for generating and outputting the second information. In other words, second information generator 108 does not generate and output the second information.

First Condition Determination Process

In the present embodiment, the first condition includes (i) and (ii) described below.

(i) A threshold amount of time or longer has passed since the user started preparing food.
(ii) The volume of sound in the dining space is a threshold volume or greater.

If (i) and (ii) described above are satisfied, it is estimated that a resident of the home is having a friendly gathering.

Figure 6:
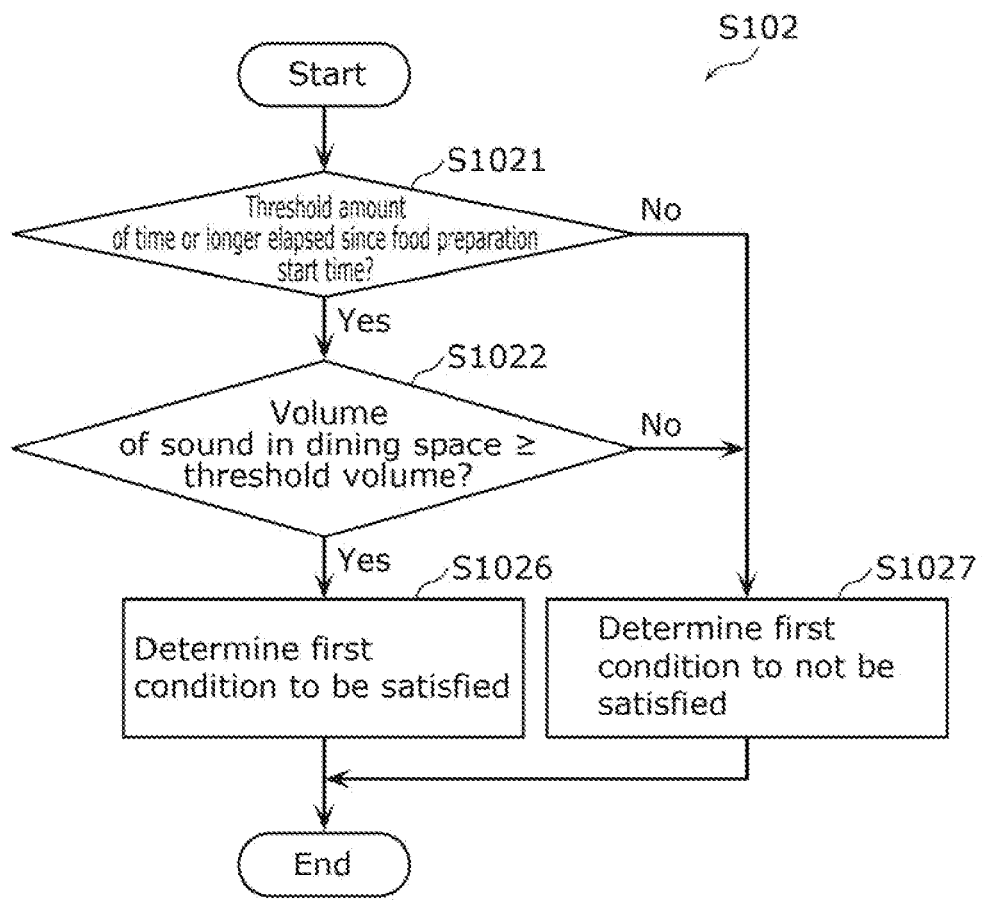
FIG. 6 is a flow chart illustrating one example of the determination process for the first condition according to Embodiment 1.

Next, the determination process for such a first condition (S102 in FIG. 5) will be described in greater detail with reference to FIG. 6. FIG. 6 is a flow chart illustrating one example of the determination process for the first condition according to Embodiment 1.

First, determiner 104 determines whether a threshold amount of time or longer has passed since the user started preparing food (S1021). In other words, determiner 104 determines whether (i) described above is satisfied or not.

The threshold amount of time is an amount of time for determining that food preparation is completed and consumption is starting. An amount of time registered in advance by the user may be used as the threshold amount of time, and, alternatively, an amount of time obtained by analyzing past food preparation and consumption times may be used as the threshold amount of time.

The time at which the user starts preparing food is detected by the first sensor disposed on the kitchen space. A motion sensor that detects the presence of a person in the kitchen space, an image sensor that captures an image of the kitchen space, a sensor that detects activity of an electronic device disposed in the kitchen space, a door sensor that detects the opening and closing of a door of the refrigerator disposed in the kitchen space, or any combination thereof can be used as the first sensor.

Figure 7:
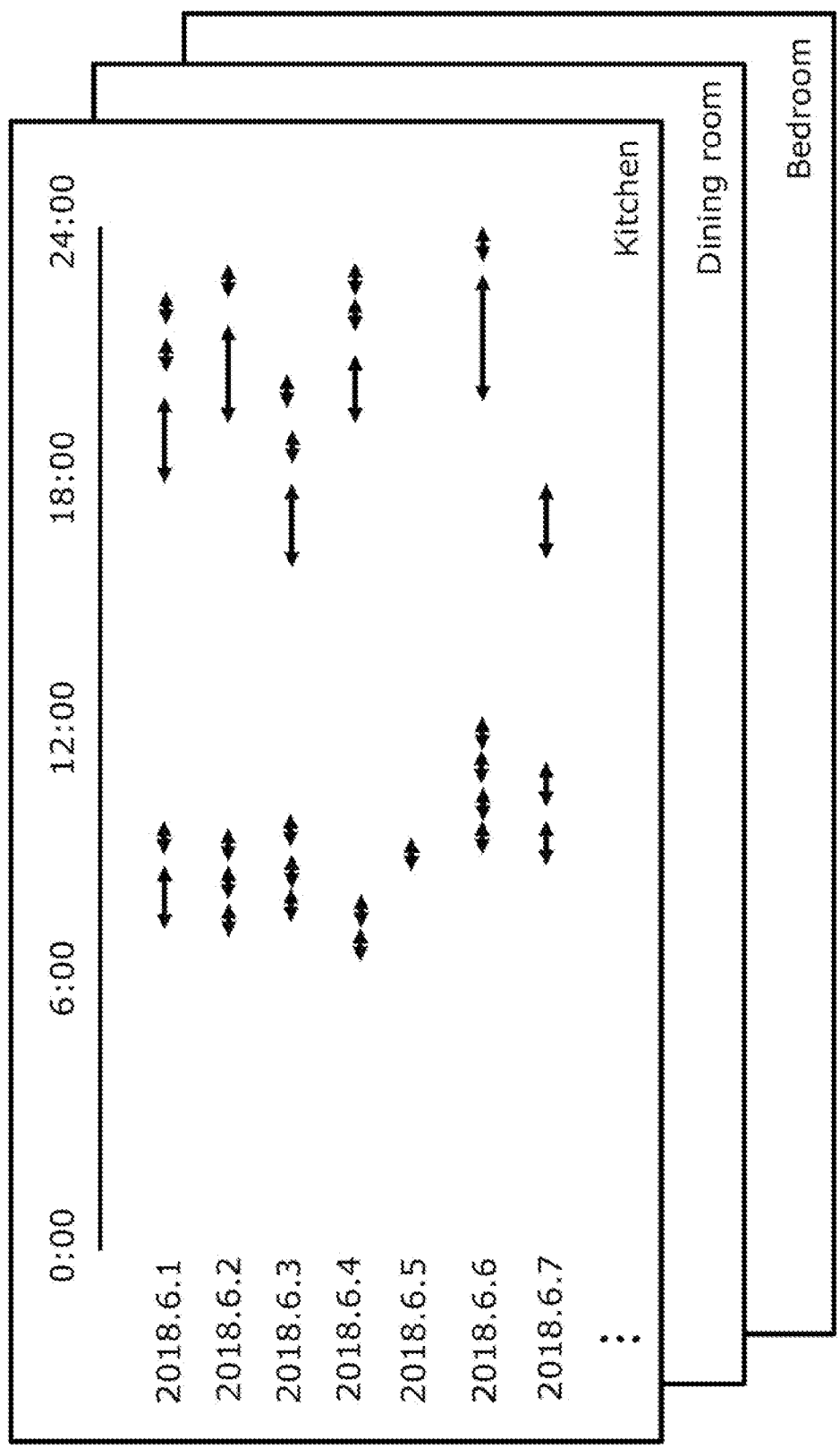
FIG. 7 illustrates one example of the sensing information related to the activity of an electronic device according to Embodiment 1.

FIG. 7 illustrates one example of the sensing information related to the activity of an electronic device according to Embodiment 1. In FIG. 7, time is represented on the horizontal axis, and days are represented on the vertical axis. The double-headed arrows indicate the time that the electronic device is active. Conversely, periods with no arrows indicate the time that the electronic device is inactive.

The electronic device is included in device group 400 and is disposed in the kitchen space. Examples of the electronic device include a luminaire and a cooking appliance (for example, an induction cooktop, gas cooktop, a microwave oven, a rice cooker, or a coffee maker or the like).

For example, the start time of an active period (a double-headed arrow) is used as the food preparation start time. Note that the food preparation start time may be limited to a start time of an active period that falls in a predefined period (for example, between 16:00 and 19:00).

FIG. 8 illustrates one example of the sensing information related to the opening and closing of a door of a refrigerator according to Embodiment 1. FIG. 8 illustrates one example of times at which a door of a refrigerator was opened in a day.

The times at which a door of the refrigerator was opened that are illustrated in FIG. 8 can be obtained by, for example, a door sensor or an image sensor that captures images of the refrigerator. Such a time at which a door of the refrigerator was opened can be used as the food preparation start time.

Figure 9:
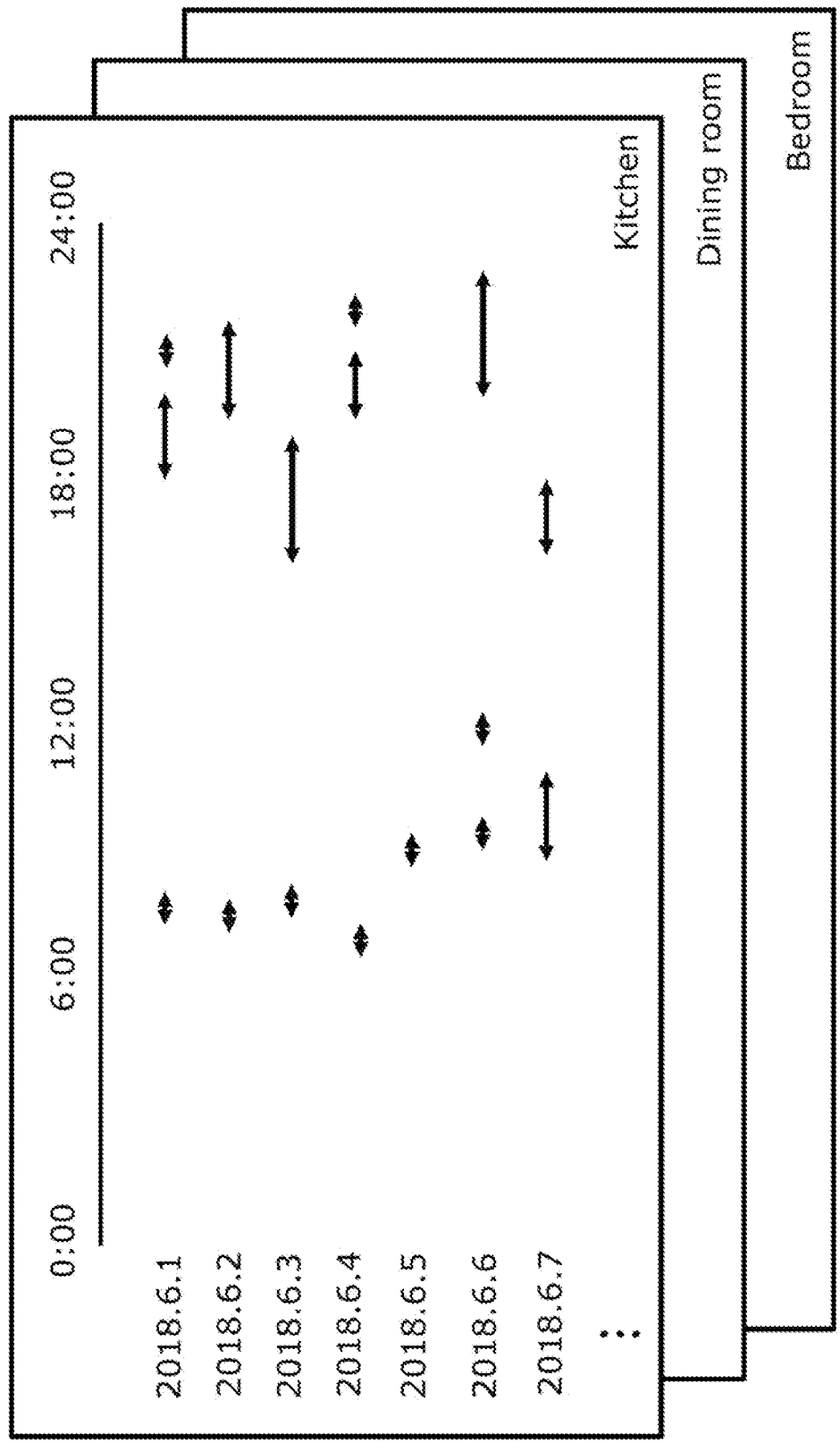
FIG. 9 illustrates one example of the sensing information related to the presence of a person according to Embodiment 1.

FIG. 9 illustrates one example of the sensing information related to the presence of a person according to Embodiment 1. In FIG. 9, time is represented on the horizontal axis, and days are represented on the vertical axis. The double-headed arrows indicate periods that a person was detected by the motion sensor (hereinafter referred to as detection periods). Conversely, periods with no arrows indicate times that a person was not detected by the motion sensor. The motion sensor is included in sensor group 300 and is disposed in the kitchen space.

Just like with the active period of the electronic device, the food preparation start time can be calculated using such detection periods.

We will now return to the description of the flowchart illustrated in FIG. 6. When a threshold amount of time or longer has passed since the user started preparing food (Yes in S1021), determiner 104 determines whether the volume of sound in the dining space is a threshold volume or greater (S1022). In other words, determiner 104 determines whether (ii) described above is satisfied or not.

Information indicating the volume of sound in the dining space is obtained by the second sensor disposed in the dining space. For example, a microphone is used as the second sensor. Information based on the information obtained by the second sensor is also referred to as sound information.

The volume of sound in the dining space may be a volume of sound obtained by first obtaining output information of a device that outputs sound and then subtracting the output information from the information indicating the volume of the sound that is obtained from the second sensor. This makes it possible to approximate the sound information to information of the voice of the user.

The threshold volume is a volume of sound for discerning that the voices of people having a friendly gathering are loud. A volume registered in advance by the user may be used as the threshold volume, and, alternatively, a volume of sound detected during past friendly gatherings may be used.

When the volume of sound in the dining space is the threshold volume or greater (Yes in S1022), determiner 104 determines that the first condition is satisfied (S1026). However, when the threshold amount of time or longer has not passed since the user started preparing food (No in S1021) or the volume of sound in the dining space is not the threshold volume or greater (No in S1022), determiner 104 determines that the first condition is not satisfied (S1027).

Note that a time series of information indicating the volume of sound may be used as the information indicating the volume of sound. A specific example of a time series of information indicating the volume of sound is information indicating the volume of sound at each of intervals in a given span of time. For example, the sound from a friendly gathering includes a mixture of conversation (first sound), which is louder than or equal to a first threshold volume and quieter than or equal to a second threshold volume, laughter (second sound), which is louder than the second threshold volume, and lulls (third sound), which are quieter than the first threshold volume. Determiner 104 may determine that the first condition is satisfied (S1026) when the proportions of periods of conversation, laughter, and lulls match predefined proportions. One example of the given proportions is 90% conversation, 1% laughter, and 9% lulls. Moreover, determiner 104 may determine that the first condition is satisfied (S1026) when the proportion of the conversation is within a given range. One example of the given range is between 80% and 95%, inclusive.

Moreover, when a sound louder than the second threshold volume continues for a given span of time or longer, determiner 104 may determine that some other sound than the user's laughter is being made and determine that the first condition is not satisfied (S1027).

Note that the order of the steps illustrated in FIG. 6 is not limited to the illustrated order. For example, steps S1021 and S1022 may be performed in the reverse order, and, alternatively, may be performed in parallel.

Service Information

For example, the first information is generated (S103), whether the first request is satisfied is determined (S112), and the second information is generated (S113), based on the result of determining whether the first condition is satisfied or not as described above, just like in Embodiment 1. Then, based on the second information, second information processing apparatus 200 generates and outputs the first service information for providing the first service to the user in space 20 via device group 400 (S121 and S122).

In the present embodiment, second information processing apparatus 200 may, as the first service information, output past user video information or image information to the display panel. Moreover, for example, when a plurality of first information processing apparatuses 100 that are associated in advance satisfy the first condition, second information processing apparatus 200 may, as the first service information, output a control signal that controls an electronic device so as to cause the plurality of first information processing apparatuses 100 to provide a telephone service. A "telephone service" includes voice-only telecommunication and video-and-voice telecommunication. Note that, before providing the telephone service, second information processing apparatus 200 may suggest, to the plurality of first information processing apparatuses 100, a telephone service via, for example, a display panel or a voice output device, and output the control signal only when the suggestion is approved.

Advantageous Effects, etc.

As described above, the information providing method according to the present embodiment is a method that uses first information processing apparatus 100 which includes a processor and memory. A first sensor is disposed in a kitchen space of a home. A second sensor is disposed in a dining space of the home. The processor can: detect, via the first sensor, a start time of food preparation by a user in the kitchen space; obtain, via the second sensor, information indicating a volume of sound in the dining space; when (i) a threshold amount of time or longer has elapsed since the start time of food preparation by the user and (ii) the volume of sound in the dining space is a first threshold volume or greater, generate first information indicating that a friendly gathering is occurring in the home; obtain, from second information processing apparatus 200 connected to first information processing apparatus 100, information indicating first request content over a network; and when content of the first information is included in the first request content, output, to second information processing apparatus 200, second information including information for identifying the user or the home, using the first information generated.

This makes it possible to determine that user is having a friendly gathering in the home, using the first sensor and the second sensor disposed in the kitchen space and the dining space, respectively. Accordingly, it is possible to output information for identifying a user or home that is in such a situation to, for example, the service provider. As a result, it is possible for a service provider or the like to provide services appropriate for the situation of the user or home. It is therefore possible to effectively use sensor data to provide services.

Moreover, for example, the information indicating the volume of sound in the dining space may include a time series of information indicating a volume of sound over a given span of time.

This makes it possible to more accurately determine that the user is having a friendly gathering in the home, based on a time series of information indicating the volume of sound.

Moreover, for example, the time series of information indicating the volume of sound may include a first sound louder than or equal to a first threshold volume and quieter than or equal to a second threshold volume, a second sound louder than the second threshold volume, and a third sound quieter than the first threshold volume, and when, in (ii), a proportion of time corresponding to the first sound in the given span of time is within a given range, the processor may generate the first information indicating that a friendly gathering is occurring in the home.

This makes it possible to obtain, as the first sound, sound corresponding to the conversation occurring in the friendly gathering, by using appropriate first and second threshold volumes. By using the proportion of the length of time that the first sound was obtained in stipulation (ii) of the first condition, it is possible to more accurately determine that the user is having a friendly gathering in the home.

Moreover, for example, the time series of information indicating the volume of sound may include a first sound louder than or equal to a first threshold volume and quieter than or equal to a second threshold volume, a second sound louder than the second threshold volume, and a third sound quieter than the first threshold volume, and when, in (ii), a proportion of time corresponding to the first sound in the given span of time, a proportion of time corresponding to the second sound in the given span of time, and a proportion of time corresponding to the third sound in the given span of time match given proportions, the processor may generate the first information indicating that a friendly gathering is occurring in the home.

This makes it possible to obtain sounds corresponding to the conversation, laughter, and lulls occurring in the friendly gathering as the first sound, the second sound, and the third sound, respectively, by using appropriate first and second threshold volumes. By using the proportions of the lengths of time that the first sound, the second sound, and the third sound were obtained in stipulation (ii) of the first condition, it is possible to more accurately determine that the user is having a friendly gathering in the home.

Variation 1

Next, Variation 1 of Embodiment 1 will be described. The present variation mainly varies from Embodiment 1 in that services are provided via first information processing apparatus 100. The present variation will be described with reference to the figures, with focus on the differences from Embodiment 1.

Note that since the configurations of service providing system 10 according to the present variation are the same as in Embodiment 1, repeated illustration and description will be omitted.

Interaction in Service Providing System 10

Figure 10:
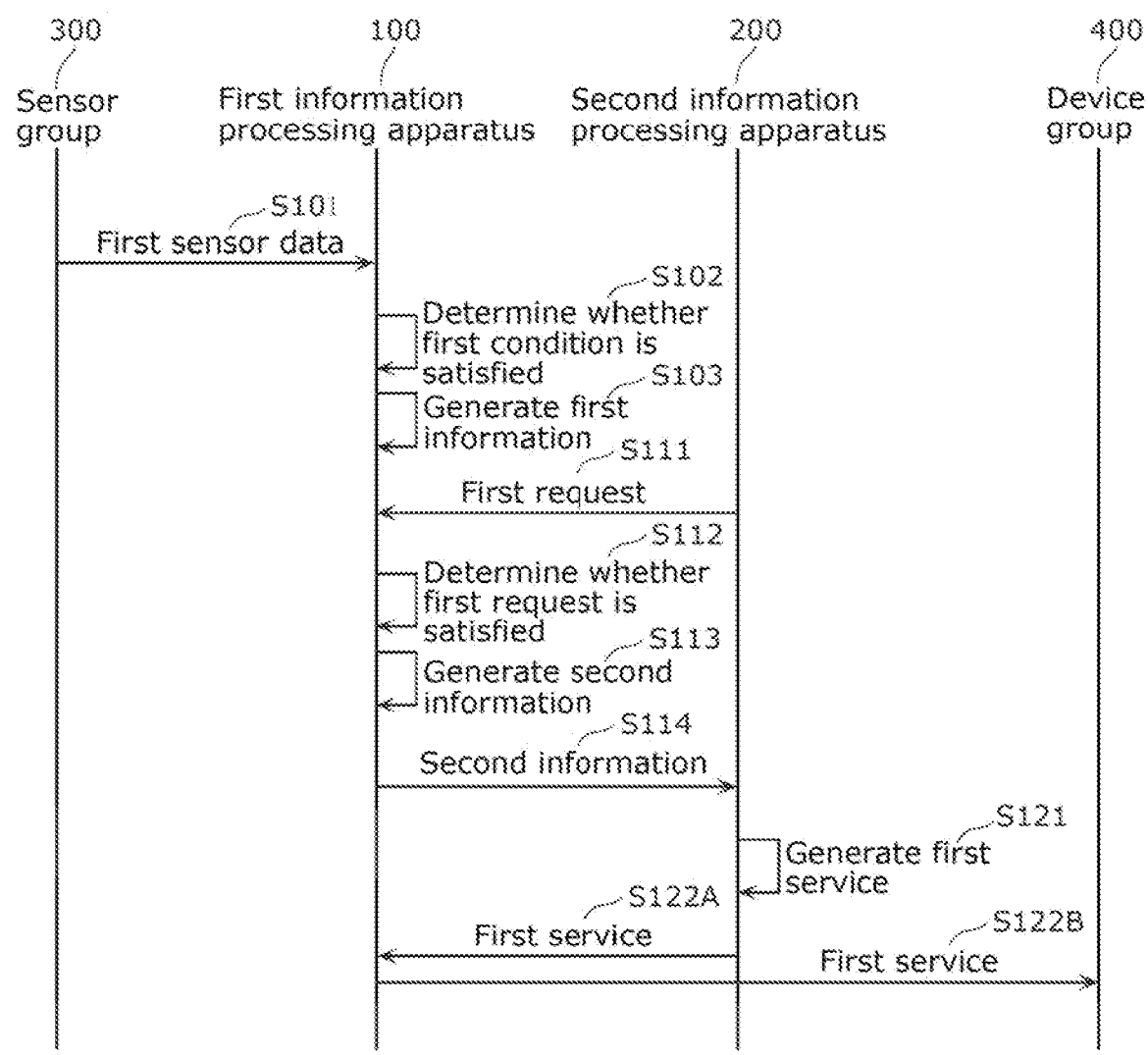
FIG. 10 is a sequence diagram for the service providing system according to Variation 1.

FIG. 10 is a sequence diagram for service providing system 10 according to Variation 1. As illustrated in FIG. 10, after generating the first service information (S121), second information processing apparatus 200 according to the present variation outputs the first service information to first information processing apparatus 100 (S122A). First information processing apparatus 100 transfers the first service information obtained from first information processing apparatus 100 to device group 400 (S122B). First information processing apparatus 100 may transmit record information on the provision of the first service information to second information processing apparatus 200. Examples of the record information include the number of times that the first service information has been provided, and attribute information related to a user or space 20. Attribute information is information that cannot identify a user or space 20. Examples of attribute information include geographical information on the user and demographics of the user. Note that the record information may be limited to information that has been permitted to be transmitted by the user in advance.

Advantageous Effects, etc.

As described above, with service providing system 10 according to the present variation, second information processing apparatus 200 can restrict disclosure of information related to space 20 to second information processing apparatus 200 since it is not necessary to directly communicate with device group 400 disposed in space 20. Accordingly, the privacy of users in space 20 can be protected.

Variation 2

Next, Variation 2 of Embodiment 1 will be described. The present variation mainly varies from Embodiment 1 in that the transmission of the first request information from second information processing apparatus 200 to first information processing apparatus 100 is performed before, rather than after, the generation of the first information (S103). The present variation will be described with reference to the figures, with focus on the differences from Embodiment 1.

Note that since the configurations of service providing system 10 according to the present variation are the same as in Embodiment 1, repeated illustration and description will be omitted.

Interaction in Service Providing System 10

FIG. 11 is a sequence diagram for service providing system 10 according to Variation 2. As illustrated in FIG. 11, first information processing apparatus 100 according to the present variation obtains the first request information (S111) before obtaining the first sensor data (S101).

It is sufficient so long as the obtainment of the first request information (S111) is performed before the determining of whether the first request is satisfied (S112); the obtainment of the first request information (S111) is not limited to being performed before the obtainment of the first sensor data (S101). Moreover, since the first request has already been transmitted, second information processing apparatus 200 may request to obtain information regarding when to determine whether the first condition is satisfied (S102). If the first sensor data is consecutively received in a time series and whether the first condition is satisfied or not (S102) is determined upon each instance of reception of the first sensor data, it may be possible to obtain information at the point in time that the situation changes in a way to satisfy the first condition, by obtaining first sensor data information that does not meet the first condition immediately before first data that does satisfy the first condition is received. For example, the second information may be first sensor data information that (i) is obtained immediately before the first condition is satisfied and (ii) does not satisfy the first condition. Moreover, first information processing apparatus 100 may suggest to second information processing apparatus 200 to change the first condition, depending on the result of an analysis of statistical information on the first sensor data information that (i) is obtained immediately before the first condition is satisfied and (ii) does not satisfy the first condition.

Advantageous Effects, etc.

As described above, with service providing system 10 according to the present variation, it is possible to output the second information regardless of the timing of the obtainment of the first request information, and possible to provide second information that is timely.

Variation 3

Next, Variation 3 of Embodiment 1 will be described. The present variation mainly varies from Embodiment 1 in that the second information includes, in addition to information for identifying a user or space, device activity information for a device related to a service. The present variation will be described with reference to the figures, with focus on the differences from Embodiment 1.

Note that since the configurations of service providing system 10 according to the present variation are the same as in Embodiment 1, repeated illustration and description will be omitted. The interaction in service providing systems 10 and 10A and the processes performed by first information processing apparatus 100 are as illustrated in FIG. 6 through FIG. 9. Accordingly, repeated illustration and description will be simplified or omitted.

Process for Generating Second Information

Next, the process for generating the second information (S113 in FIG. 5) according to the present variation will be described in greater detail with reference to FIG. 12. FIG. 12 is a flow chart illustrating one example of the process for generating the second information (S113) according to Variation 3. Note that in the present variation, the first request information includes information for identifying the service provided by second information processing apparatus 200.

First information processing apparatus 100 selects a device related to the service identified by the first request information from among device group 400 disposed in space 20 in which the first information was generated (S1131). For example, first information processing apparatus 100 selects a device from among device group 400 based on the effect the service has on the user's five senses (sight, hearing, smell, touch, and taste) and the effect the device has on the user's five senses.

FIG. 13A illustrates one example of information indicating relationships between services and the five senses. FIG. 13B illustrates one example of information indicating relationships between devices and the five senses. In FIG. 13A and FIG. 13B, a check indicates that the service or device affects the corresponding sense, and a dash indicates that the service or device does not affect the corresponding sense.

For example, FIG. 13A shows that service 1 affects the senses of sight and hearing and does not affect the senses of smell or touch (back, waist, and eyes). For example, FIG. 13B shows that the television affects the senses of sight and hearing and does not affect the senses of smell or touch (back, waist, and eyes).

When, for example, service 1 is identified by the first request information, first information processing apparatus 100 selects, from among the devices illustrated in FIG. 13B, the television and the speaker which are associated with the sense of sight or the sense of hearing that are affected by service 1 as illustrated in FIG. 13A.

Next, first information processing apparatus 100 obtains device activity information for the selected device(s) (S1132). The device activity information is information indicating the activity status of a device or devices. For example, the device activity information indicates whether a device is active or not. For example, the device activity information may be obtained directly from the device(s), or may be obtained via a sensor or sensors.

First information processing apparatus 100 then generates the second information including the device activity information (S1133).

Advantageous Effects, etc.

As described above, according to the present variation, it is possible for the second information to include the device activity information for a device. Accordingly, second information processing apparatus 200 can provide a service that activates a device in an inactive state, and can avoid competition with services for devices that are operating, by referencing the device activity information. For example, when there are many devices that are in an active state, second information processing apparatus 200 can avoid causing multiple devices to confuse the senses of the user.

Although the second information includes the device activity information for selected devices in the present variation, this example is non-limiting. For example, the second information may include the device activity information for all devices. Moreover, the device activity information may be output separately from the second information.

The second information may moreover include only device activity information for devices that have been permitted to provide the device activity information by the user. Moreover, when there is a device that has been denied permission to provide the device activity information by the user, the second information may include information indicating that the device has been denied permission to provide the device activity information by the user. For example, when second information processing apparatus 200 provides a service using a device that has been denied permission to provide the operation information by the user, second information processing apparatus 200 may request permission from the user to provide the service.

The second information may include, instead of the device activity information, sound information used for determining whether the first condition is satisfied. The second information may include the sound information in addition to the device activity information. Examples of the sound information that is included in the second information include information indicating a change over time in the volume of the sound of the second information or the proportions of conversation, laughter, and lulls in the sound of the second information. Moreover, the number of users participating in the conversation may be included as sound information. For example, the number of users may be obtained from the sound information using a known analysis method, and may be obtained based on information from sensor group 300. Second information processing apparatus 200 can provide a service by setting, in advance, the status of space 20 corresponding to the sound information, and referencing information based on the sound. For example, second information processing apparatus 200 provides a service according to whether the users are having a calm friendly gathering or are having a lively friendly gathering. If the users are having a calm friendly gathering, the proportion of lulls is high or the proportion of laughter is low. If the users are having a lively friendly gathering, the proportion of laughter is high. For example, when the sound information exhibits the same trend, a telephone service may be provided by a plurality of first information processing apparatuses 100, which makes it possible to provide a service taking into account the situation of space 20 as defined by conversation by phone.

When approval is obtained for a suggestion of a telephone service between a plurality of first information processing apparatuses 100 that are not associated in advance, even if the plurality of first information processing apparatuses 100 are not associated in advance, when the sound information exhibits the same trend, second information processing apparatus 200 may provide the telephone service. Here, information provided to the partner when a telephone service is provided between a plurality of first information processing apparatuses 100 that are associated in advance may enable the reduction of information provided to the partner when a telephone service is provided between a plurality of first information processing apparatuses 100 that are not associated in advance. For example, a voice telephone service is provided. Or, if the telephone service includes video, the video information in space 20 may be reduced. For example, in order to reduce the video information, the region in which the video is displayed may be reduced in size, and background information other than the person may be removed.

Variation 4

Next, Variation 4 of Embodiment 1 will be described. The present variation mainly varies from Embodiment 1 in that the second information includes, in addition to information for identifying a user or space, suitability information indicating service provision suitability. The present variation will be described with reference to the figures, with focus on the differences from Embodiment 1.

Note that since the configurations of service providing system 10 according to the present variation are the same as in Embodiment 1, repeated illustration and description will be omitted. The interaction in service providing systems 10 and 10A and the processes performed by first information processing apparatus 100 are as illustrated in FIG. 6 through FIG. 9. Accordingly, repeated illustration and description will be simplified or omitted.

Process for Generating Second Information

Next, the process for generating the second information (S113 in FIG. 5) according to the present variation will be described in greater detail with reference to FIG. 14. FIG. 14 is a flow chart illustrating one example of the process for generating the second information (S113) according to Variation 4. Note that in the present variation, the first request information includes information for identifying the service provided by second information processing apparatus 200.

First information processing apparatus 100 obtains a service provision history for space 20 or the user (S1134). Service provision history is information associating services provided in the past to space 20 or the user with the date and time that those services were provided.

Figure 15:
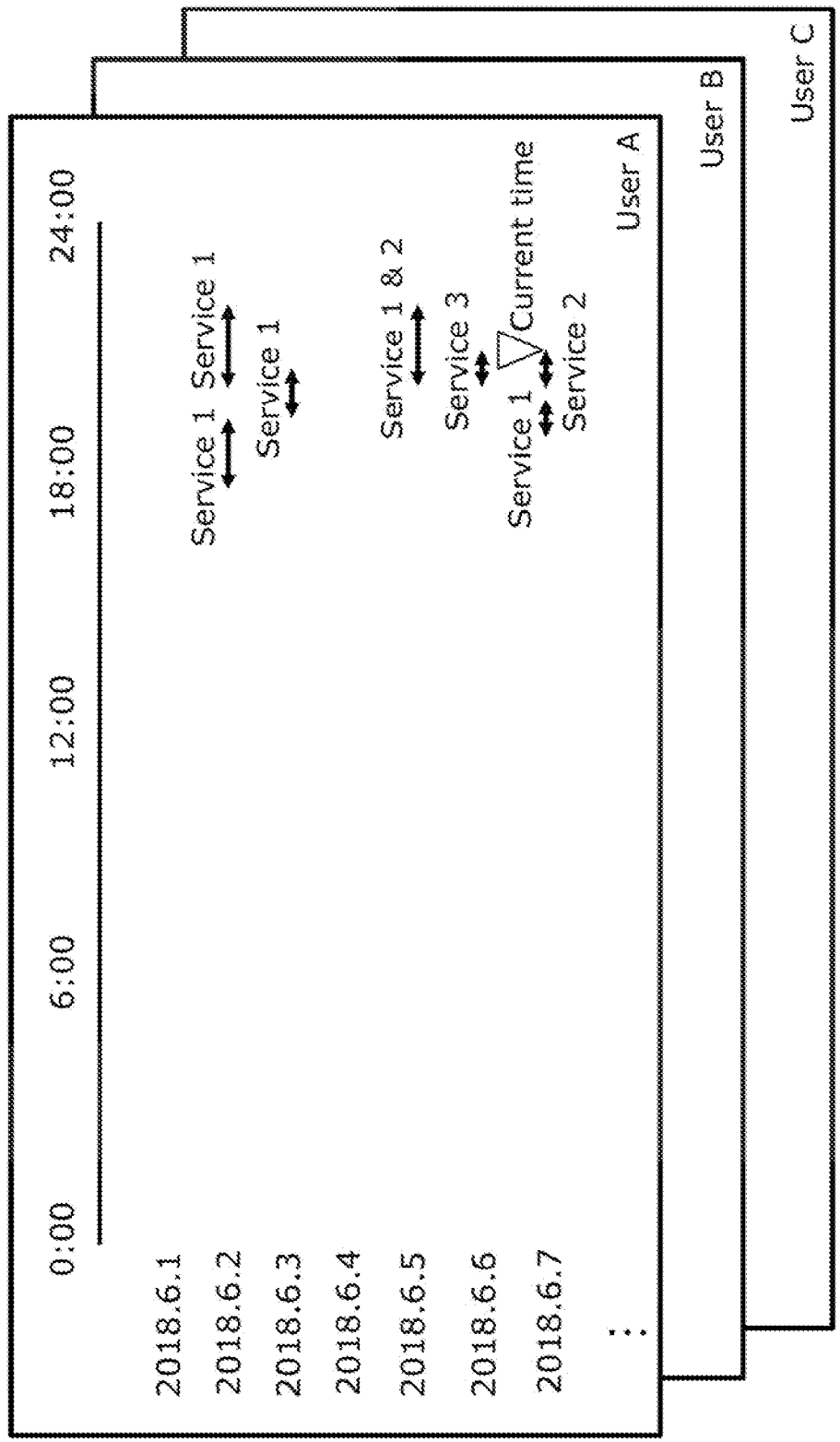
FIG. 15 illustrates one example of the service provision history according to Variation 4.

FIG. 15 illustrates one example of the service provision history according to Variation 4. In FIG. 15, time is represented on the horizontal axis, and days are represented on the vertical axis. The double-headed arrows indicate the time that a service was or will be provided to space 20 or the user. For example, service 1 was provided twice between 18:00 and 24:00 on Jun. 2, 2018. Note that the service provision history can include a plurality of different services provided by a plurality of different second information processing apparatuses 200 (in other words, a plurality of different service providers).

Next, first information processing apparatus 100 evaluates the suitability of the provision of the service identified by the first request information for space 20 or the user, based on the obtained service provision history (S1135). More specifically, for example, first information processing apparatus 100 evaluates the suitability of the provision of the service identified by the first request information based on the number of times the service was provided in a given span of time. As another example, first information processing apparatus 100 may evaluate the suitability of the provision of the service identified by the first request information based on another service that is currently being provided.

Next, specific examples of the evaluation of the suitability of the service provision will be given with reference to FIG. 16A through FIG. 16C. FIG. 16A illustrates one example of service provision availability information according to Variation 4. For example, service provision availability information may be stored in advance in third memory 107, and, alternatively, may be obtained from an external server (not illustrated in the figures).

The service provision availability information indicates, for each service, the number of times per day that service can be provided, as well as situations in which that service cannot be provided. For example, the service provision availability information illustrated in FIG. 16A indicates that service 1 and service 3 both have no restrictions for how many times they can be provided per day, and that service 2 can only be provided once a day.

According to the service provision history illustrated in FIG. 15, on the current day (Jun. 7, 2018), service 1 and service 2 have already been provided. Accordingly, based on the service provision availability information illustrated in FIG. 16A, the suitability of the provision of services 1 and 3 is evaluated high, and the suitability of the provision of service 2 is evaluated low.

Moreover, the service provision availability information illustrated in FIG. 16A indicates that services 1 and 2 cannot be provided in user situations A and B, respectively. For example, a situation in which the user's activity is more delayed than usual may be used as user situations A and B. In such cases, by prohibiting the provision of less urgent services (for example, music playback or providing horoscope information), it is possible to provide services suitable to the user's situation. For example, a situation in which the user is having a friendly gathering in the home may be used as user situations A and B.

FIG. 16B illustrates one example of information indicating services that are prohibited from being provided simultaneously according to Variation 4. For example, the information indicating services that are prohibited from being provided simultaneously may be stored in advance in third memory 107, and, alternatively, may be obtained from an external server (not illustrated in the figures).

The information indicating services that are prohibited from being provided simultaneously indicates, more specifically, pairs of services that are prohibited from being or allowed to be provided simultaneously. A check indicates the two services are prohibited from being provided simultaneously, while a dash indicates the two services are allowed to be provided simultaneously.

For example, the information illustrated in FIG. 16B indicates that service 1 is allowed to be provided simultaneously with services 2 and 3. In other words, service 1 can be provided along with each of service 2 and service 3. For example, the information illustrated in FIG. 16B also indicates that service 2 is prohibited from being provided simultaneously with service 3. In other words, the information indicates that service 2 cannot be provided along with service 3.

FIG. 16C illustrates one example of information indicating services that are prohibited from being changed according to Variation 4. For example, the information indicating services that are prohibited from being changed may be stored in advance in third memory 107, and, alternatively, may be obtained from an external server (not illustrated in the figures).

The information indicating services that are prohibited from being changed indicates, more specifically, services prohibited from being or allowed to be provided in place of a service that is already being provided. A check indicates that changing from the service on the left column to the service on the top row is prohibited, and a dash indicates that changing from the service on the left column to the service on the top row is allowed.

For example, in FIG. 16C, when service 1 is currently being provided, changing from service 1 to service 2 is prohibited. On the other hand, when service 2 is currently being provided, changing from service 2 to service 1 is allowed. Moreover, when service 2 is currently being provided, changing from service 2 to service 3 is also prohibited.

In the service provision history illustrated in FIG. 15, service 2 is being provided at the current time. However, based on the information indicating services that are prohibited from being provided simultaneously that is illustrated in FIG. 16B and the information indicating services that are prohibited from being changed that is illustrated in FIG. 16C, the suitability of the provision of service 1 is evaluated high and the suitability of the provision of service 3 is evaluated low.

Such an evaluation result is expressed as two or more levels. For example, two levels, namely "suitable" and "unsuitable", can be used as the evaluation result. As another example, a number score from 0 to 10 or 0 to 100 can be used as the evaluation result.

Lastly, first information processing apparatus 100 generates the second information including suitability evaluation information indicating the evaluation result (S1136).

Advantageous Effects, etc.

As described above, according to the present variation, it is possible for the second information to include suitability evaluation information. Accordingly, second information processing apparatus 200 can, for example, skip the provision of a service when the service's suitability evaluation is low, and can thus inhibit the provision of services at inappropriate times. As a result, service providing systems 10 and 10A can reduce excessive provision of services and inhibit interference between services.

Although the second information includes the suitability evaluation information in the present variation, this example is non-limiting. For example, in addition to or instead of the suitability evaluation information, the second information may include the service provision history information. Moreover, the service suitability information may be output separately from the second information.

Variation 5

Next, Variation 5 of Embodiment 1 will be described. The present variation mainly varies from Embodiment 1 in that, when first requests having the same request content have already been received from a plurality of second information processing apparatuses 200 (see Variation 2 above), the second information is output to a second information processing apparatus 200 selected based on priority level. The present variation will be described with reference to the figures, with focus on the differences from Embodiment 1.

Note that since the configurations of service providing system 10 according to the present variation are the same as in Embodiment 1, repeated illustration and description will be omitted. The interaction in service providing systems 10 and 10A and the processes performed by first information processing apparatus 100 are as illustrated in FIG. 6 through FIG. 9. Accordingly, repeated illustration and description will be simplified or omitted.

Process for Outputting Second Information

Figure 17:
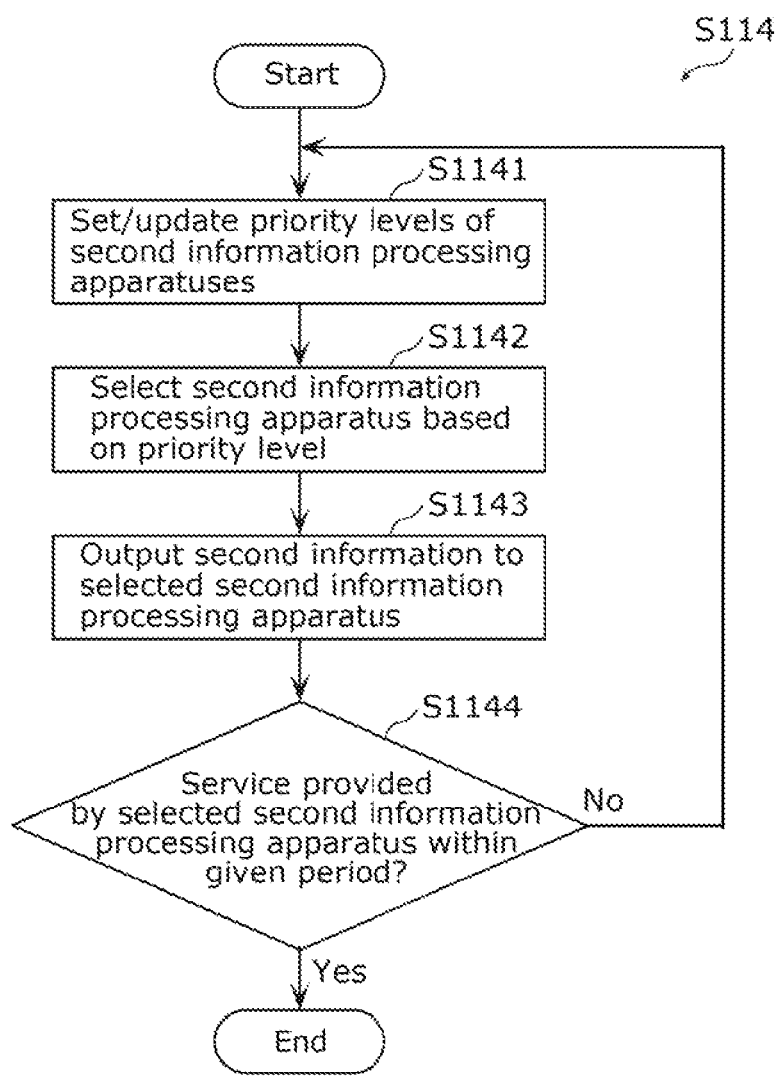
FIG. 17 is a flow chart illustrating one example of the process for outputting the second information according to Variation 5.

Next, the process for outputting the second information (S114 in FIG. 5) according to the present variation will be described in greater detail with reference to FIG. 17. FIG. 17 is a flow chart illustrating one example of the process for outputting the second information (S114) according to Variation 5.

First information processing apparatus 100 sets the priority level of each of a plurality of second information processing apparatuses 200 (S1141). In other words, first information processing apparatus 100 sets the priority level for each of a plurality of second information processing apparatuses 200 that correspond to a plurality of first requests having the same request content. For example, the priority levels may be included in the first request information, and in such cases, the priority levels are set according to the priority levels included in the first request information.

The priority levels may be set according to the situation of space 20 or the user that is obtained from sensor group 300 and device group 400. Moreover, the priority levels of the plurality of second information processing apparatuses 200 may be set based on bid amounts by the service providers for the provision of the second information.

Next, first information processing apparatus 100 selects one or more second information processing apparatuses 200 based on the set priority level (S1142). For example, first information processing apparatus 100 selects, from among a plurality of second information processing apparatuses 200 that correspond to a plurality of first requests having the same request content, the second information processing apparatus 200 having the highest priority level. Note that the number of second information processing apparatuses 200 selected is not limited to one.

First information processing apparatus 100 then outputs the second information to the selected second information processing apparatus 200 (S1143). Thereafter, first information processing apparatus 100 determines whether the service has been provided by the selected second information processing apparatus 200 within a given period (S1144). In other words, whether or not the selected second information processing apparatus 200 has provided the service within a given period starting when the second information is output is determined. An empirically or experimentally predefined period can be used as the given period. For example, the same period may be used across a plurality of services. Alternatively, individually set times for the plurality of services may be used as the given period.

When the service is provided within the given period (Yes in S1144), processing ends. However, when the service is not provided within the given period (No in S1144), processing proceeds to step S1141. This time in step S1141, the priority levels of the plurality of second information processing apparatuses 200 are updated such that the priority level of the second information processing apparatus 200 that did not provide the service is reduced. First information processing apparatus 100 then selects one or more second information processing apparatuses 200 based on the updated priority levels (S1142). Here, the system may be configured so that the service can only be provided to the user or space 20 when the priority level is set to the highest level. For example, if the second information is sent to both the second information processing apparatus 200 set to the highest priority level before the update and the second information processing apparatus 200 set to the highest priority level after the update, there is a chance that the service may be redundantly provided when, after a given period, the service is attempted to be provided by the second information processing apparatus 200 set to the highest priority level before the update. Accordingly, the system may be set so that only the second information processing apparatus 200 set to the highest priority level can use the second information. For example, this may be achieved by setting the system so that the second information may only be used at the time the service is executed, so that the encryption is changed after each update, and providing an encryption key corresponding to the second information processing apparatus 200 set to the highest priority level.

Advantageous Effects, etc.

As described above, according to the present variation, first information processing apparatus 100 can select a second information processing apparatus 200 based on priority level.

Accordingly, service providing systems 10 and 10A can select a second information processing apparatus 200 that is appropriate for the provision of the service from among a plurality of second information processing apparatuses 200 corresponding to a plurality of first requests having the same request content.

(Other Variations)

Although information indicating the activity of an electronic device related to food preparation is used in Embodiment 1, the information used is not limited to this example. For example, information indicating the activity of an electronic device in the bathroom may be used.

As another example, the first condition may include (iii) and (iv) described below.

(iii) A threshold amount of time of longer has passed since the user started bathing.

(iv) A volume of sound in the living space or the bedroom space is a threshold volume or greater.

The bathing start time is obtained by sensor group 300 disposed in the bathroom or changing room.

In other words, the first condition may be satisfied if the activity status of a device associated with a given action of the user and the volume of sound in a given space are greater than or equal to a threshold.

Types of Services

Next, the types of services in the service providing system according to Embodiment 1 will be described.

Overview of Provided Services

Figure 18A:
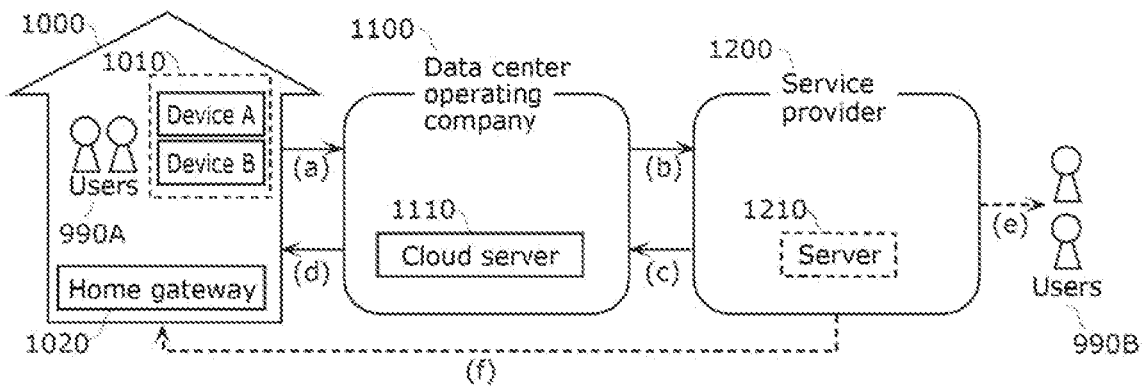
FIG. 18A illustrates an overview of the service providing system.

FIG. 18A illustrates an overview of the service providing system.

Group 1000 is, for example, a business, an organization, or a household or the like. The scale of group 1000 may be any scale. Group 1000 includes devices A and B included in plural devices 1010, and home gateway 1020. For example, plural devices 1010 are devices included in device group 400 according to Embodiment 1 described above. For example, home gateway 1020 is gateway 500 according to Embodiment 1 described above. Plural devices 1010 include devices that can connect to the internet (for example, smartphones, PCs, televisions, etc.) as well as devices that cannot connect to the internet themselves (for example, lights, washing machines, etc.). Even devices that cannot connect to the internet themselves but can connect to the internet via home gateway 1020 may be included. Moreover, user(s) 990A that use plural devices 1010 are in group 1000.

Figure 18B:
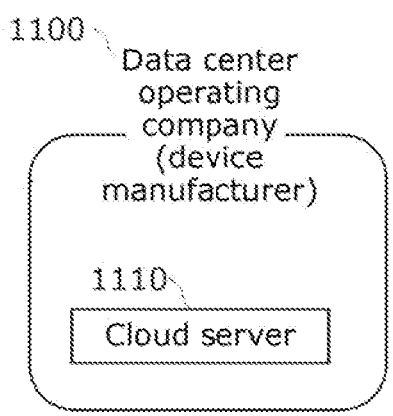
FIG. 18B illustrates one example of the data center operating company.
Figure 18C:
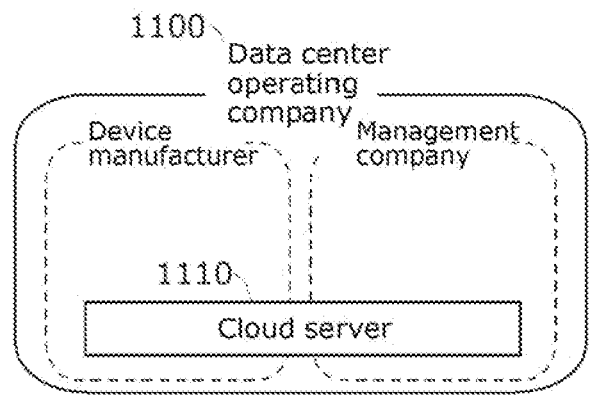
FIG. 18C illustrates one example of the data center operating company.

Data center operating company 1100 includes cloud server 1110. Cloud server 1110 is a virtual server that links with various devices over the internet. For example, cloud server 1110 is first information processing apparatus 100 according to Embodiment 1 described above. For example, cloud server 1110 manages big data which is difficult to manage with typical database management tools. Data center operating company 1100 performs operations of a data center, such as data management and management of cloud server 1110. Services performed by data center operating company 1100 will be described in greater detail later. Here, data center operating company 1100 is not limited to a company that only performs operations such as data management and operation of cloud server 1110. For example, when a device manufacturer that develops and produces one device among plural devices 1010 also performs data management and management of cloud server 1110, that device manufacturer corresponds to data center operating company 1100 (FIG. 18B). Moreover, data center operating company 1100 is not limited to a single company. For example, when a device manufacturer and another management company work in consort or through shared contribution to carry out the data management and operation of cloud server 1110, both or one of the device manufacturer and the management company corresponds to data center operating company 1100 (FIG. 18C).

Service provider 1200 has server 1210. As used herein, the scale of server 1210 may be any scale. For example, server 1210 may be memory included in a personal computer. Moreover, there are cases in which service provider 1200 does not have server 1210. For example, server 1210 is second information processing apparatus 200 according to Embodiment 1 described above.

Note that home gateway 1020 is not required in the service described above. For example, when cloud server 1110 does all of the data management, home gateway 1020 is not necessary. Furthermore, there are cases in which there are no devices that cannot connect to the internet themselves, such as when all household devices are connected to the internet.

Next, the flow of information in the above service will be described.

First, device A and device B in group 1000 transmit information they obtained to cloud server 1110 in data center operating company 1100. Cloud server 1110 accumulates the information from device A or device B ((a) in FIG. 18A). The accumulated information is information indicating, for example, the operation status, operating date and time, operation mode, position, etc., of plural devices 1010. Examples include, but are not limited to, television viewing history, television video recorder scheduled recordings, washing machine operating date and time, washing machine laundry amount, date and time that the door of a refrigerator opened or closed, number of times that the door of a refrigerator opened or closed, and amount of food in a refrigerator; the accumulated information includes any information that can be obtained from any kind of device. There are cases in which the information is provided directly to cloud server 1110 from plural devices 1010 themselves via the internet. The information may be obtained from plural devices 1010 and intermediately accumulated by home gateway 1020, from where it is provided to cloud server 1110.

Next, cloud server 1110 in data center operating company 1100 provides the accumulated information to service provider 1200 in fixed units. Here, fixed units may be units in which the data center operating company can organize the collected information and provide the collected information to service provider 1200, and may be units requested by service provider 1200. Although the term "fixed units" is used herein, the units need not be fixed; the amount of information provided may be variable according to the situation. The information is stored in server 1210 of service provider 1200 ((b) in FIG. 18A). Service provider 1200 then organizes the information to suit the service to be provided to the user, and then provides it to the user. The user on the receiving end may be user 990A that uses plural devices 1010, and may be external user(s) 990B. The method of providing the service to the user may be a method whereby the service is provided directly from the service provider, for example ((e), (f) in FIG. 18A). Alternatively, the method of providing the service to the user may be a method whereby the service is provided to the user via cloud server 1110 in data center operating company 1100 ((c), (d) in FIG. 18A). Moreover, cloud server 1110 in data center operating company 1100 may organize the information to suit the service to be provided to the user, and then provide the information to service provider 1200.

Note that user 990A and user 990B may be the same or different users.

For example, the techniques described above can be realized in the following types of cloud services. However, the techniques described above are not limited to being realized in the following examples.

Service Type 1: In-Company Data Center

Figure 19:
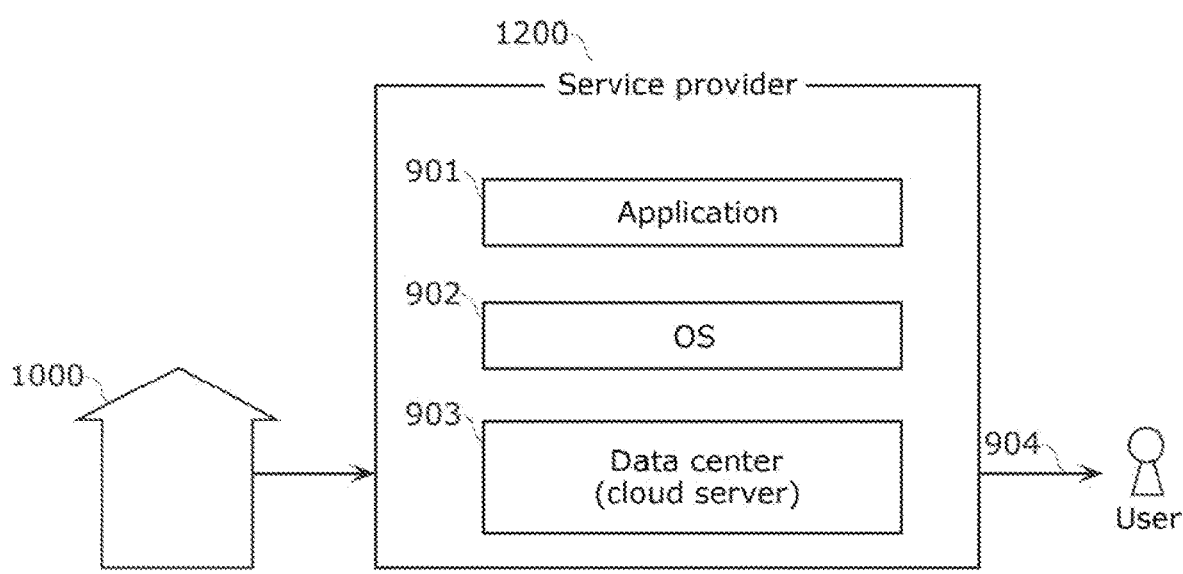
FIG. 19 illustrates service type 1 (in-company data center).

FIG. 19 illustrates service type 1 (in-company data center). In this type, service provider 1200 obtains information from group 1000 and provides a service to a user. In this type, service provider 1200 functions as a data center operating company. In other words, the service provider has cloud server 1110 that manages big data. Accordingly, there is no data center operating company.

In this type, service provider 1200 operates and manages data center 903 (cloud server 1110). Service provider 1200 also manages OS 902 and application 901. Service provider 1200 provides service 904 using OS 902 and application 901 that it manages.

Service Type 2: IaaS

Figure 20:
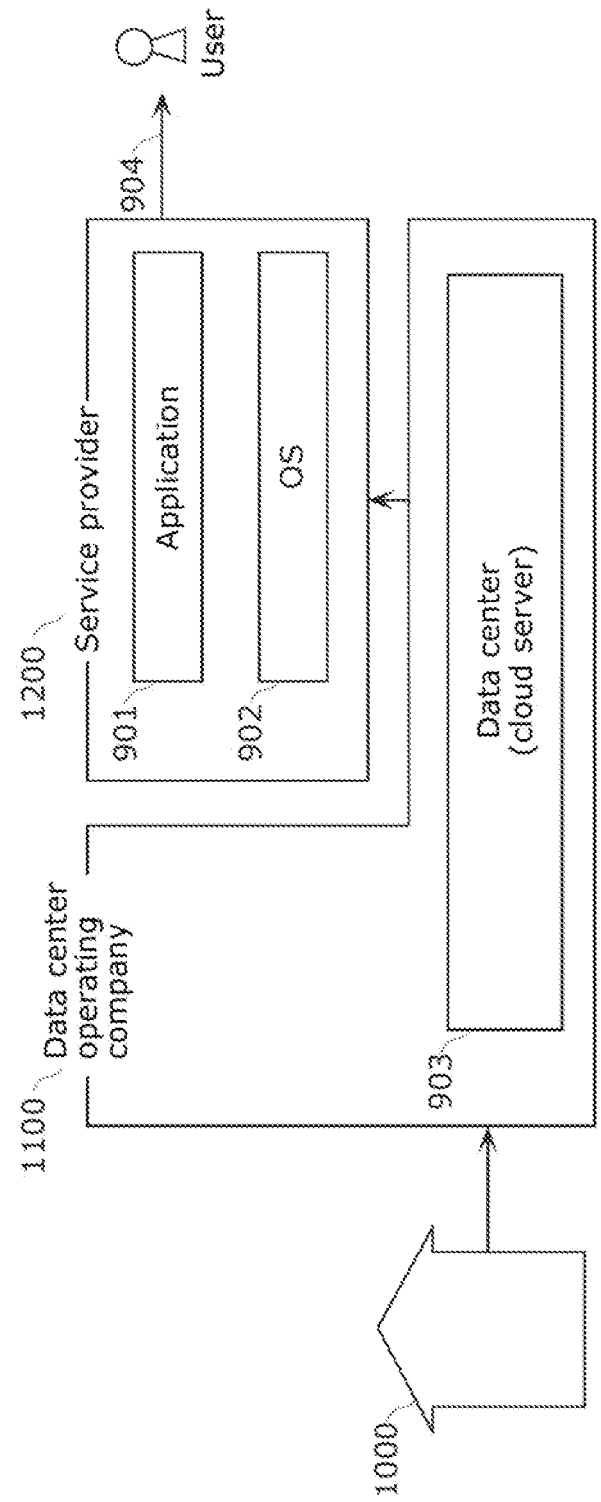
FIG. 20 illustrates service type 2 (IaaS).

FIG. 20 illustrates service type 2 (IaaS). As used herein, "IaaS" stands for infrastructure as a service, and refers to a cloud service provision model that provides an infrastructure for constructing and operating a computer system, as a service via the internet.

In this type, data center operating company 1100 operates and manages data center 903 (cloud server 1110). Service provider 1200 also manages OS 902 and application 901. Service provider 1200 provides service 904 using OS 902 and application 901 that it manages.

Service Type 3: PaaS

Figure 21:
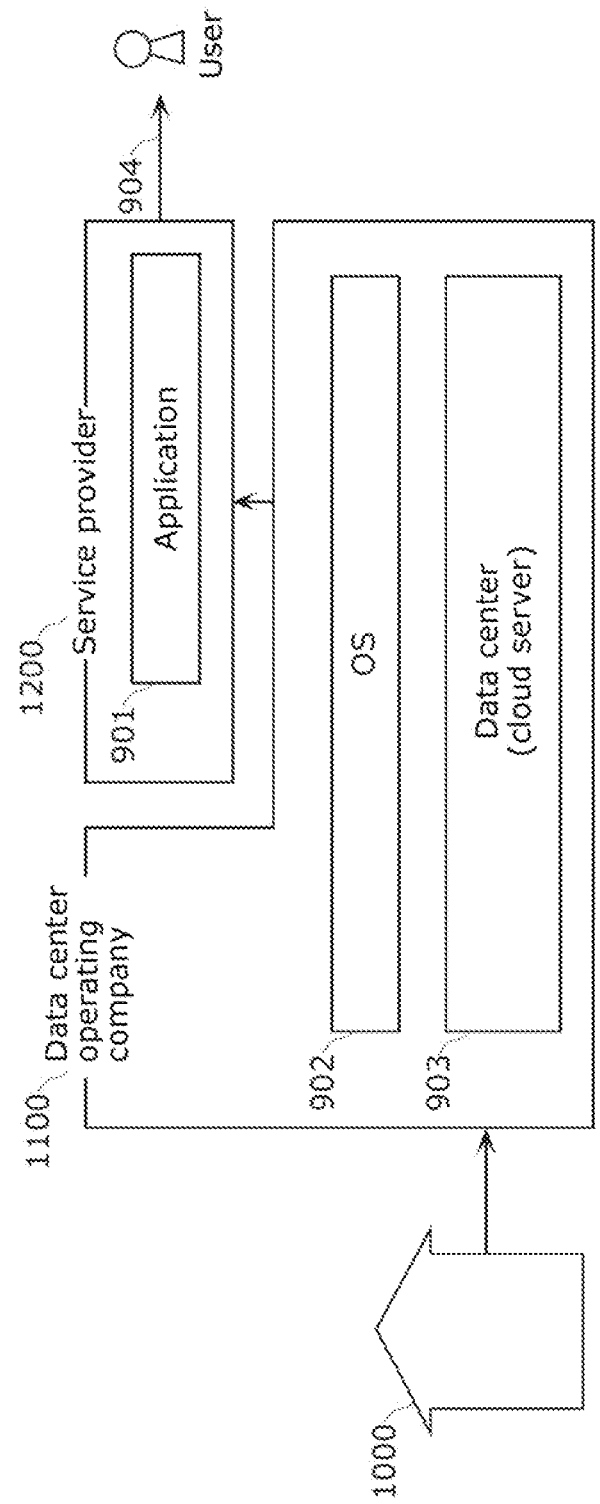
FIG. 21 illustrates service type 3 (PaaS).

FIG. 21 illustrates service type 3 (PaaS). As used herein, "PaaS" stands for platform as a service, and refers to a cloud service provision model that provides a platform for constructing and operating software, as a service via the internet.

In this type, data center operating company 1100 manages OS 902 and operates and manages data center 903 (cloud server 1110). Service provider 1200 also manages application 901. Service provider 1200 provides service 904 using OS 902 managed by the data center operating company and application 901 that itself manages.

Service Type 4: SaaS

Figure 22:
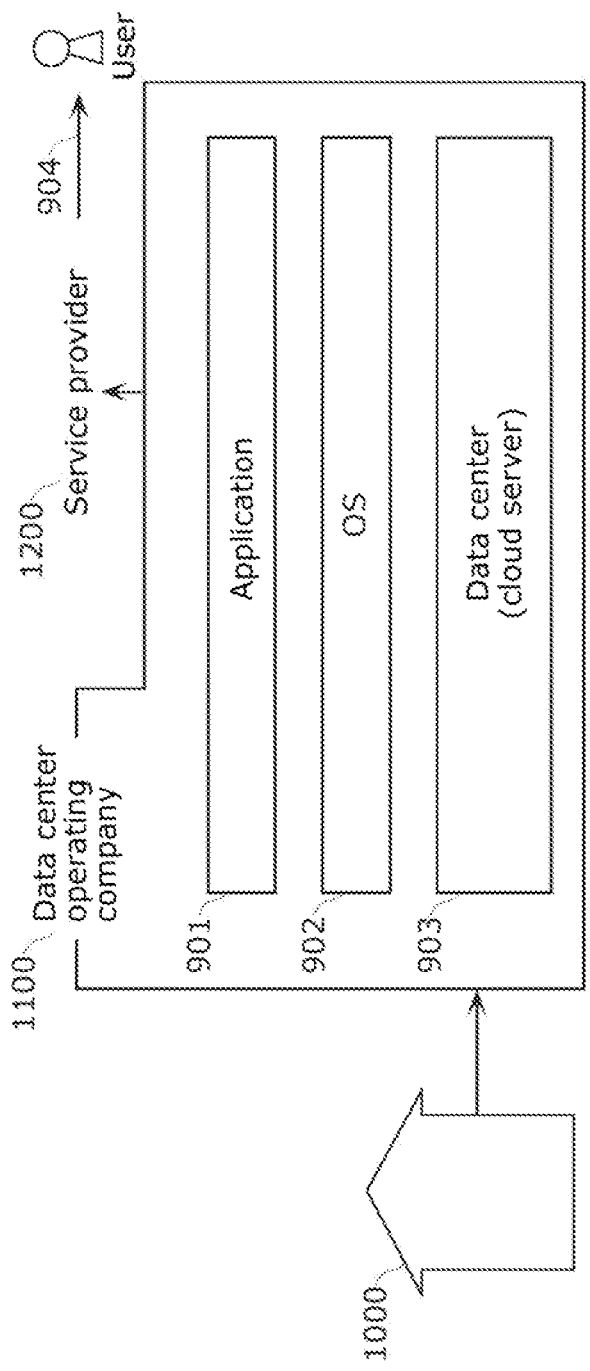
FIG. 22 illustrates service type 4 (SaaS).

FIG. 22 illustrates service type 4 (SaaS). As used herein, "SaaS" stands for software as a service. For example, SaaS refers to a cloud service provision model that, for example, has a function that allows a company or individual (user) that does not have a data center (cloud server) to use, over a network such as the internet, an application provided by a platform provider that has a data center (cloud server).

In this type, data center operating company 1100 manages application 901, manages OS 902, and operates and manages data center 903 (cloud server 1110). Service provider 1200 provides service 904 using OS 902 and application 901 that data center operating company 1100 manages.

In any of the above types, the service provision is performed by service provider 1200. Moreover, for example, the service provider or the data center operating company may develop, for example, the OS, application, or database of big data themselves, or may outsource the OS, application, or database of big data from a third party.

Other Embodiments

Although the service providing system according to one or more aspects of the present disclosure has been described based on embodiments, the present disclosure is not limited to these embodiments. Those skilled in the art will readily appreciate that various modifications may be made in these exemplary embodiments and that other embodiments may be obtained by arbitrarily combining the elements of the embodiments without materially departing from the novel teachings and advantages of the subject matter of the present disclosure. Accordingly, all such modifications and other embodiments are included in one or more aspects of the present disclosure.

For example, in Embodiment 1, first information processing apparatus 100 that processes the sensor data and second information processing apparatus 200 that generates the service information are provided as separate apparatuses, but first information processing apparatus 100 and second information processing apparatus 200 may be configured as a single information processing apparatus. In such cases, since there is no need for interaction between first information processing apparatus 100 and second information processing apparatus 200, when the first condition is satisfied, processes from the generation of the first information to the output of the second information may be skipped.

INDUSTRIAL APPLICABILITY

The techniques of the present disclosure can be used as an information processing apparatus that provides information for providing a service to a user.

The invention claimed is:

1. An information providing method that uses a first information processing apparatus which includes a processor and memory,
wherein a first sensor is disposed in a first space of a home,
a second sensor is disposed in a second space of the home, and
the processor:
detects, via the first sensor, a start time of food preparation by a user in the first space;
obtains, via the second sensor, information indicating a volume of sound in the second space; and
when (i) a threshold amount of time or longer has elapsed since the start time of food preparation by the user and (ii) the volume of sound in the second space is a first threshold volume or greater, generates and outputs first information indicating that a friendly gathering is occurring in the home.

2. The information providing method according to claim 1,
wherein the information indicating the volume of sound in the second space includes a time series of information indicating a volume of sound over a given span of time.

3. The information providing method according to claim 2,
wherein the time series of information indicating the volume of sound includes a first sound louder than or equal to a first threshold volume and quieter than or equal to a second threshold volume, a second sound louder than the second threshold volume, and a third sound quieter than the first threshold volume, and
when, in (ii), a proportion of time corresponding to the first sound in the given span of time is within a given range, the processor generates the first information indicating that a friendly gathering is occurring in the home.

4. The information providing method according to claim 2,
wherein the time series of information indicating the volume of sound includes a first sound louder than or equal to a first threshold volume and quieter than or equal to a second threshold volume, a second sound louder than the second threshold volume, and a third sound quieter than the first threshold volume, and
when, in (ii), a proportion of time corresponding to the first sound in the given span of time, a proportion of time corresponding to the second sound in the given span of time, and a proportion of time corresponding to the third sound in the given span of time match given proportions, the processor generates the first information indicating that a friendly gathering is occurring in the home.

5. The information providing method according to claim 1,
wherein the processor further:
obtains, from a second information processing apparatus connected to the first information processing apparatus, information indicating first request content over a network; and
when content of the first information is included in the first request content, outputs, to the second information processing apparatus, second information including information for identifying the user or the home, using the first information generated.

6. The information providing method according to claim 5,
wherein a plurality of electronic devices are disposed in the home, and
the second information includes activity statuses of the plurality of electronic devices, the activity statuses being for use upon the second information processing apparatus providing a service to the first information processing apparatus.

7. The information providing method according to claim 5,
wherein the second information includes information based on sound in the second space which is for use upon the second information processing apparatus providing a service to the first information processing apparatus.

* * * * *